Roland M. Gardner
Stanley J. Gartner
Edwin W. Barrett
INVENTORS

BY *Laurence Burns,*

Attorney

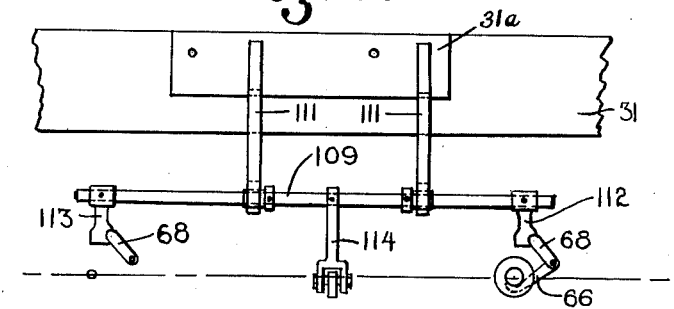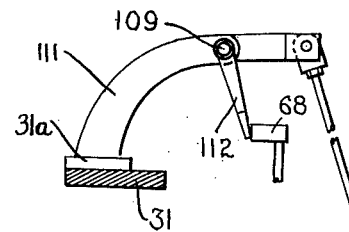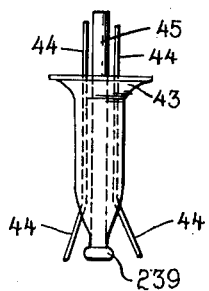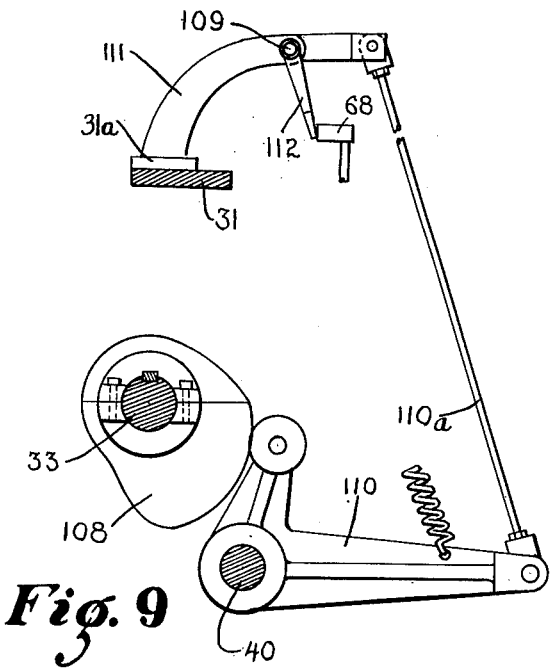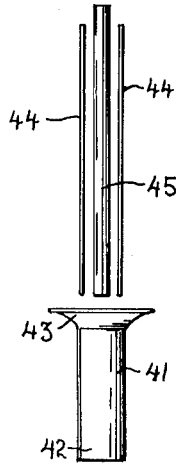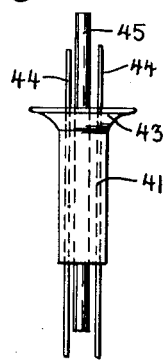

May 5, 1953  R. M. GARDNER ET AL  2,637,144
AUTOMATIC LAMP STEM FABRICATING APPARATUS
Filed Dec. 27, 1945  14 Sheets-Sheet 6
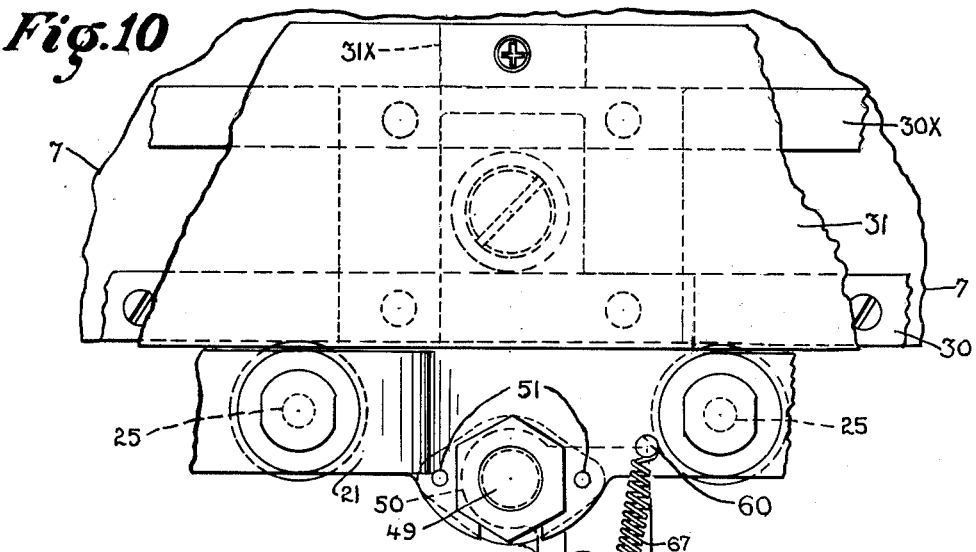
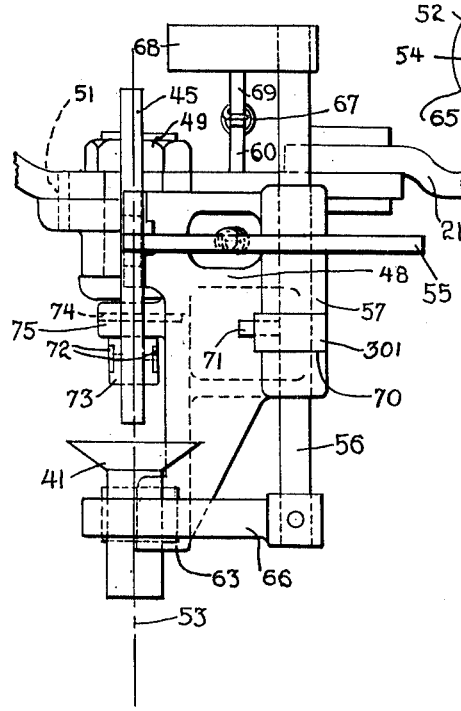
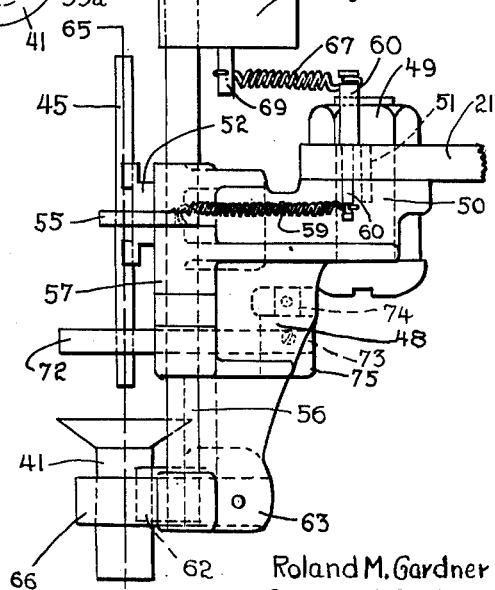
Roland M. Gardner
Stanley J. Gartner
Edwin W. Barrett
INVENTORS
BY Lawrence Burns,
Attorney May 5, 1953  R. M. GARDNER ET AL  2,637,144
AUTOMATIC LAMP STEM FABRICATING APPARATUS
Filed Dec. 27, 1945  14 Sheets-Sheet 7
*Fig.13*
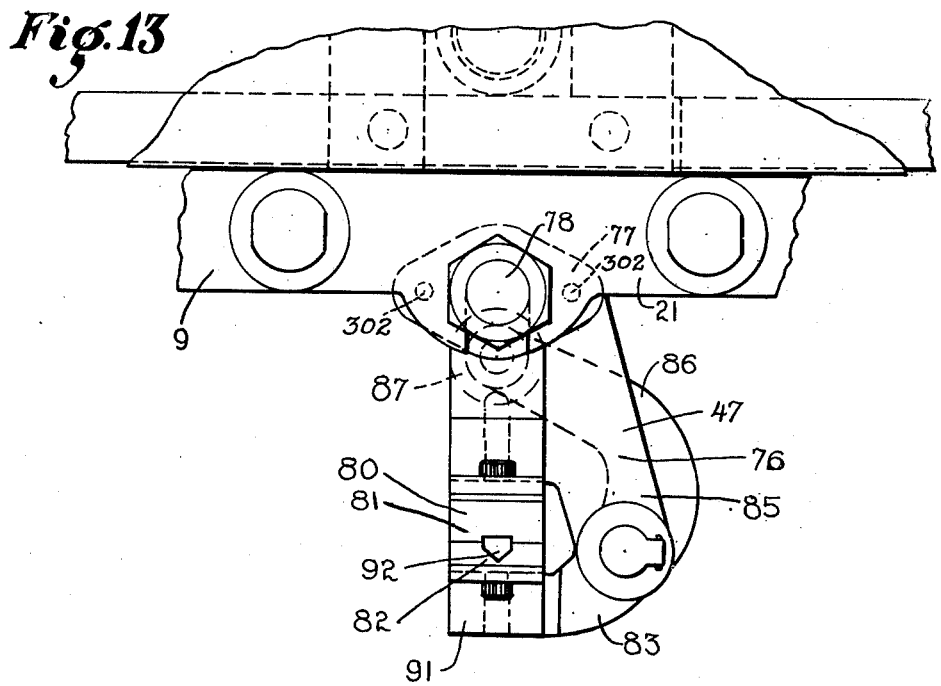
*Fig.14*
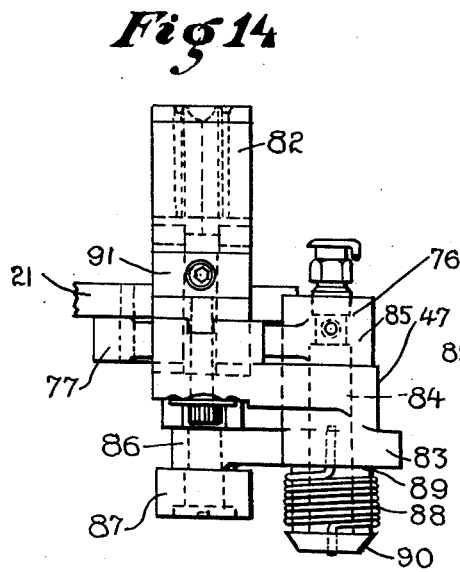
*Fig.15*
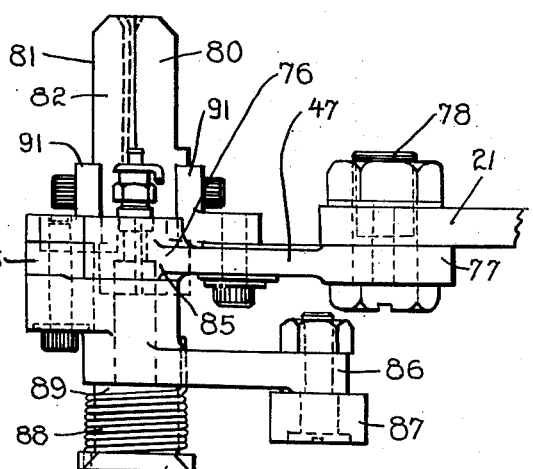
*Fig.16*  *Fig.17*
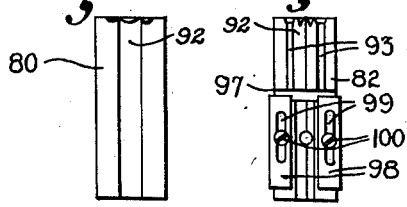
Roland M. Gardner
Stanley J. Gartner
Edwin W. Barrett
INVENTORS
BY Lawrence Burns,
Attorney May 5, 1953  R. M. GARDNER ET AL  2,637,144
AUTOMATIC LAMP STEM FABRICATING APPARATUS
Filed Dec. 27, 1945  14 Sheets-Sheet 8

Roland M. Gardner
Stanley J. Gartner
Edwin W. Barrett
INVENTORS

BY Lawrence Burns
ATTORNEY

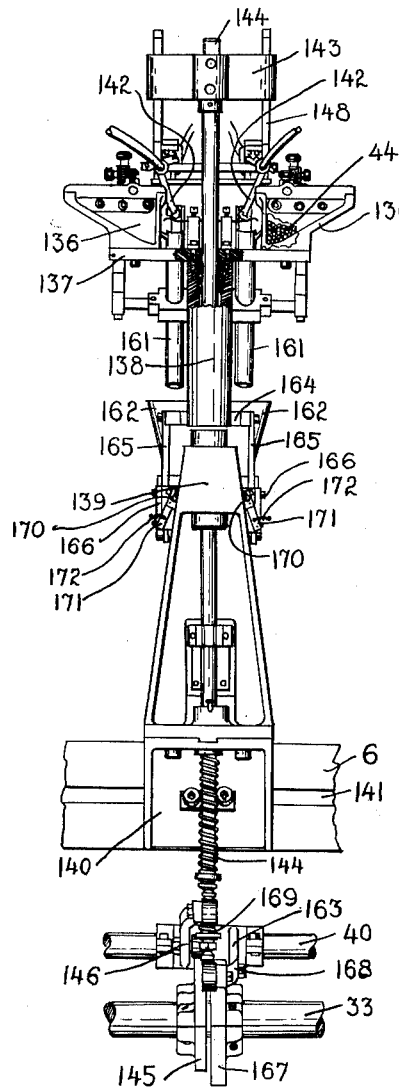

May 5, 1953  R. M. GARDNER ET AL  2,637,144
AUTOMATIC LAMP STEM FABRICATING APPARATUS
Filed Dec. 27, 1945  14 Sheets-Sheet 10
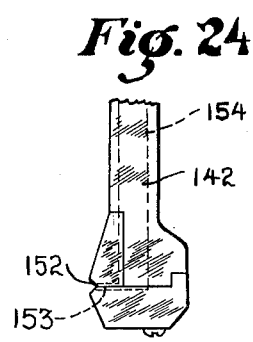
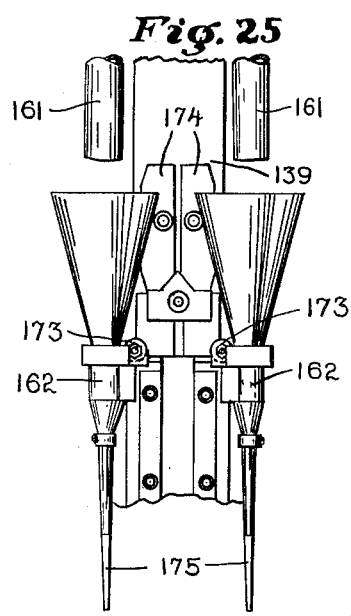
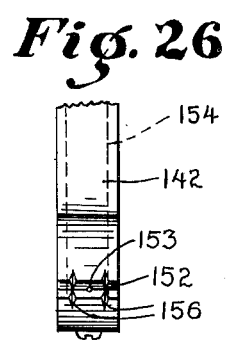
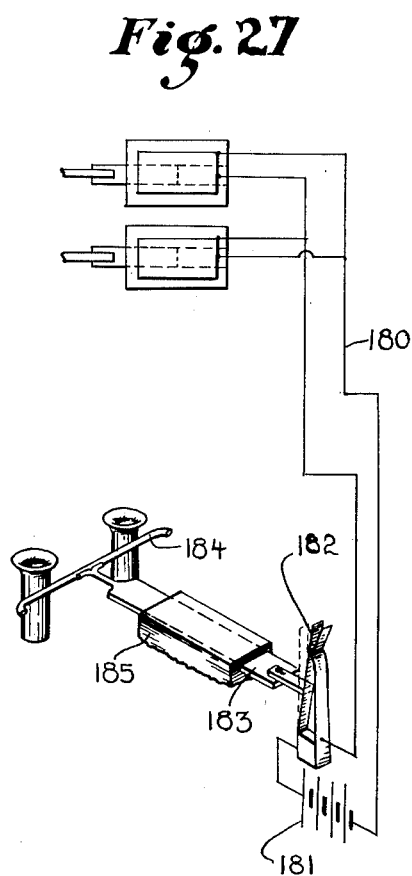
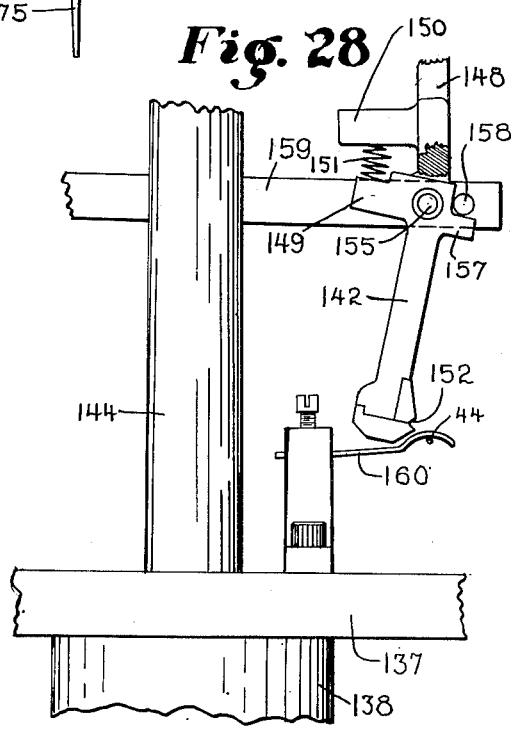
Roland M. Gardner
Stanley J. Gartner
Edwin W. Barrett
INVENTORS
BY Lawrence Burns
ATTORNEY May 5, 1953  R. M. GARDNER ET AL  2,637,144
AUTOMATIC LAMP STEM FABRICATING APPARATUS
Filed Dec. 27, 1945  14 Sheets-Sheet 11
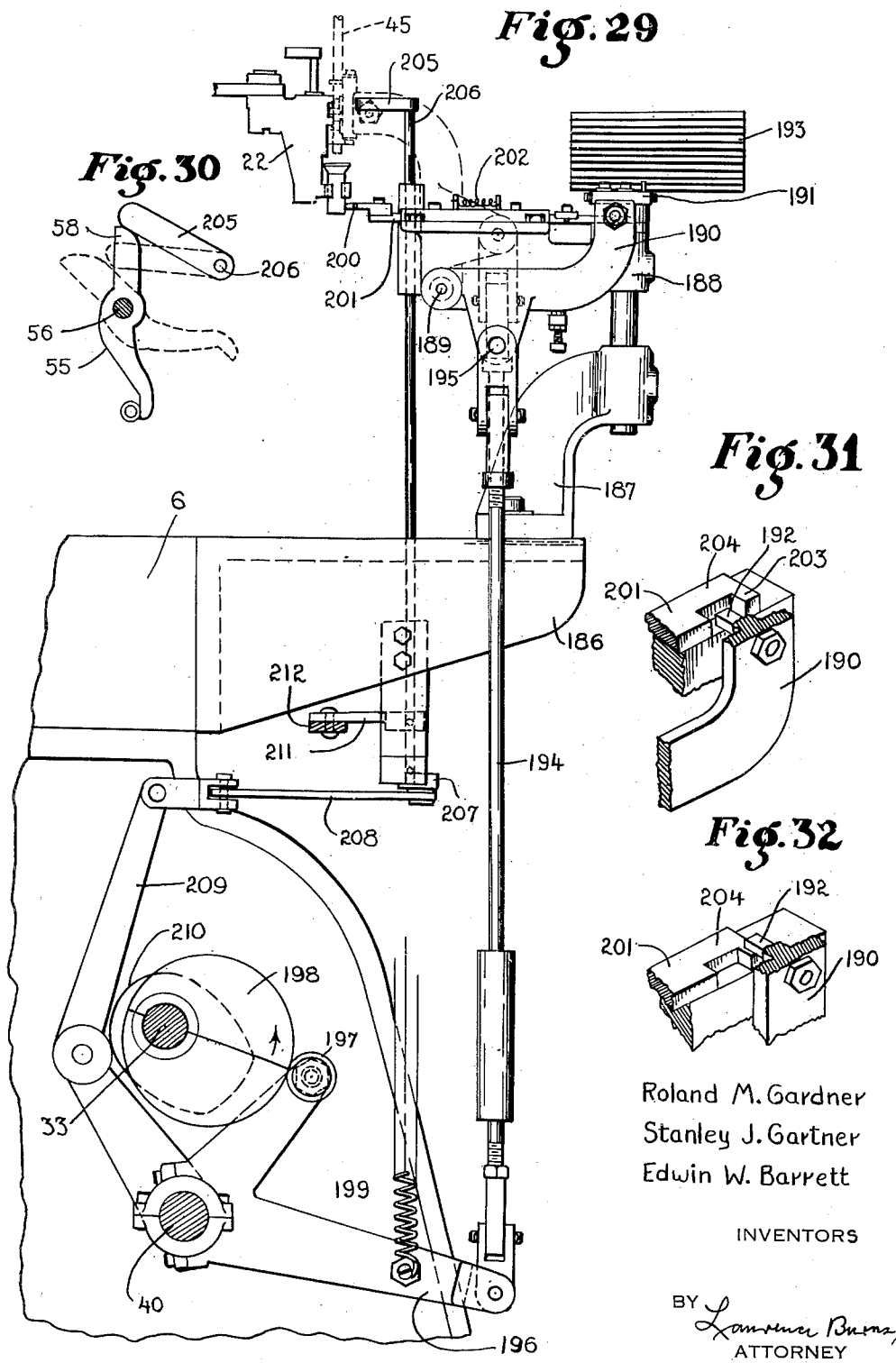
Roland M. Gardner
Stanley J. Gartner
Edwin W. Barrett
INVENTORS
BY Lawrence Burns
ATTORNEY

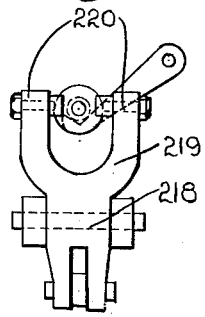
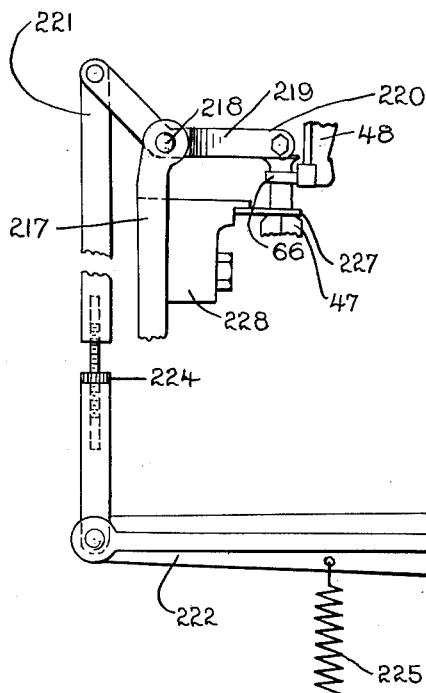
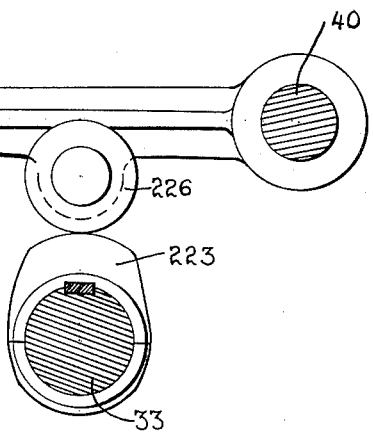
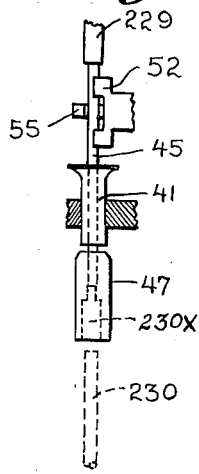

May 5, 1953  R. M. GARDNER ET AL  2,637,144
AUTOMATIC LAMP STEM FABRICATING APPARATUS
Filed Dec. 27, 1945  14 Sheets-Sheet 13
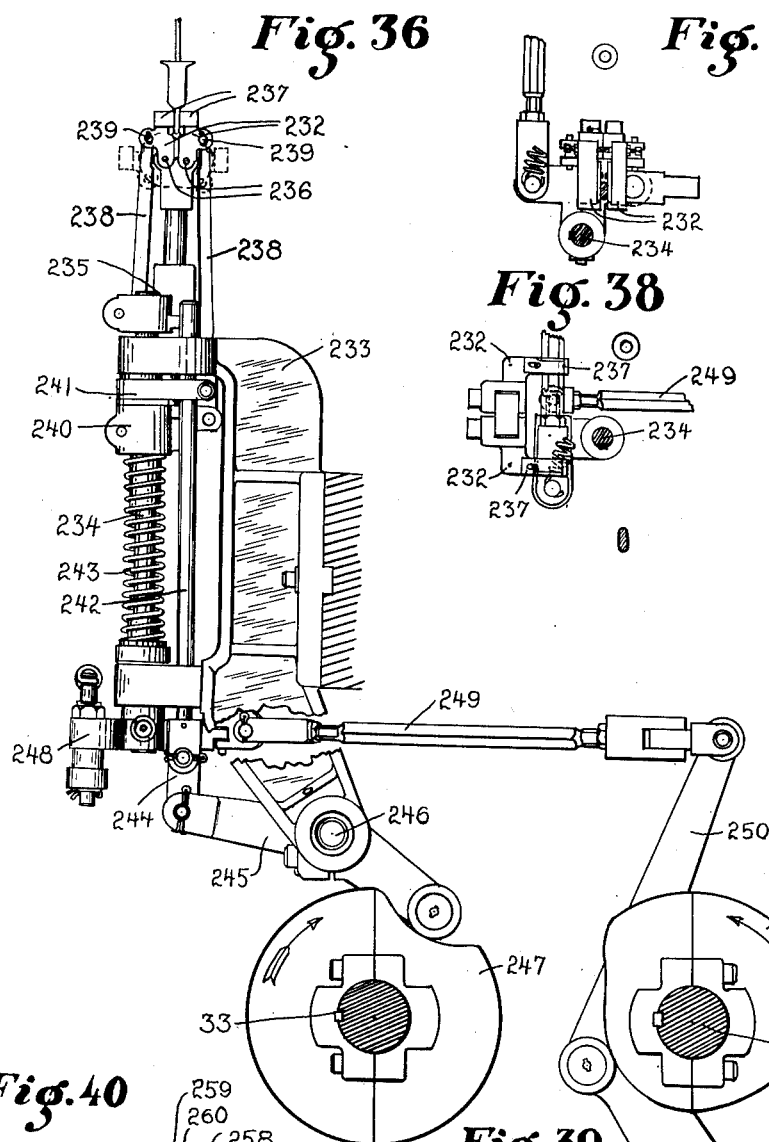
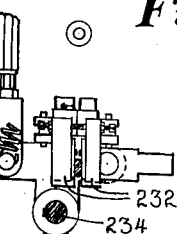
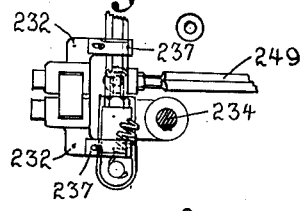
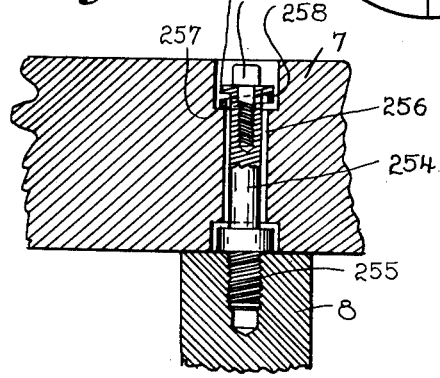
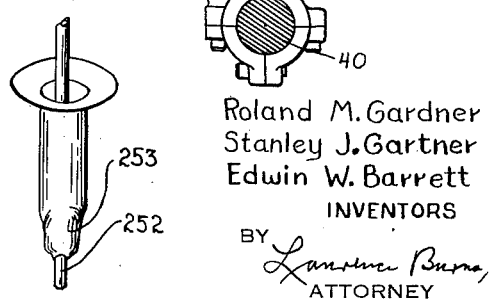
Roland M. Gardner
Stanley J. Gartner
Edwin W. Barrett
INVENTORS
BY Lawrence Burns
ATTORNEY May 5, 1953  R. M. GARDNER ET AL  2,637,144
AUTOMATIC LAMP STEM FABRICATING APPARATUS
Filed Dec. 27, 1945  14 Sheets-Sheet 14
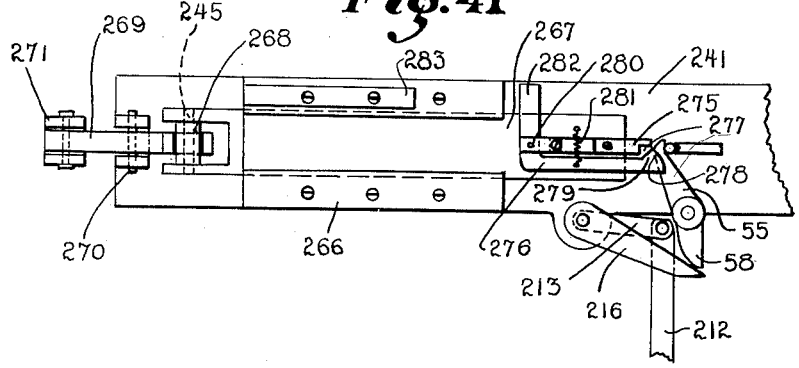
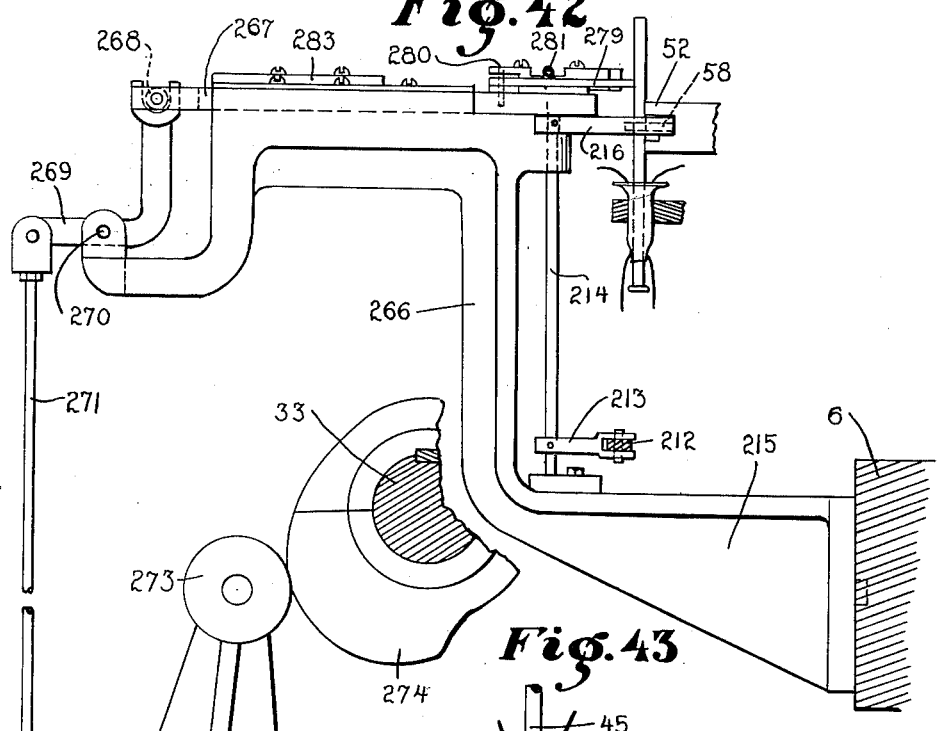
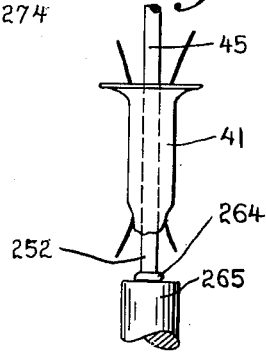
Roland M. Gardner
Stanley J. Gartner
Edwin W. Barrett
INVENTORS
BY Lawrence Burns
ATTORNEY Patented May 5, 1953

2,637,144

UNITED STATES PATENT OFFICE 2,637,144

AUTOMATIC LAMP STEM FABRICATING APPARATUS

Roland M. Gardner, Swampscott, Mass., Stanley J. Gartner, Emporium, Pa., and Edwin W. Barrett, Danvers, Mass., assignors to Sylvania Electric Products Inc., Salem, Mass., a corporation of Massachusetts Application December 27, 1945, Serial No. 637,440

10 Claims. (Cl. 49—2)

This invention relates to automatic machines for fabricating glass stem elements for lamps or thermionic devices.

The invention has for a principal object to provide a machine which is readily converted from the execution of a given operation or series of operations to another operation or series of operations.

A further object of the invention is to provide an automatic machine which is exceptionally durable and which is consistently accurate in operation.

A further object of the invention is to provide a machine which is so efficient and rugged in construction that its speed of operation may be increased substantially above the normal speed of such machines.

A further object of the invention is to provide a machine of the type indicated, the elements of which offer maximum accessibility.

Other objects and features of the invention will more fully appear from the following description in connection with the accompanying drawings and will be particularly pointed out in the annexed claims.

The machine is provided with an extremely compact and rigid frame, elongated and of girder like construction, occupying a minimum of floor space.

The frame is provided with means for supporting and driving a pair of chain type conveyors having a plurality of stem carrying units secured thereon. The two conveyors are driven at the same speed and are superposed or arranged in other suitable cooperative relationship. The major portions of the conveyors travel in a straight line lengthwise along the frame and are driven by suitable sprockets. One conveyor is shorter than the other and so arranged that its operative elements function for only a portion of the operating cycle of the other conveyor.

Extending parallel with the conveyors and journalled in the frame are two or more cam shafts driven in timed relation to the conveyors and having cams thereon which actuate operational devices which function successively to fabricate the stem assemblies carried by the conveyors. The operational devices are secured along the frame in predetermined succession adjacent the conveyors.

Means are provided for positioning the operational devices at any point along the frame and maintaining predetermined correct relationship with the stems carried by the conveyors. Thus accurate and readily established timing of the operations is obtained.

In conjunction with the cams, direct acting levers are provided to transmit the motion developed by the cams to the operational devices. The cams and levers themselves may be readily shifted lengthwise of the machine along the cam shafts properly to cooperate with their respective operational elements.

The operational elements are indicated in part to illustrate their relationship to the main driving and supporting elements of the machine and to aid in illustrating the general operation of the machine.

To provide a better understanding of the invention a preferred embodiment thereof will now be described and illustrated in the drawings in which:

Figure 1 is a side elevation of the machine in which certain elements are removed and certain portions are shown schematically;

Figures 1-a and 1-b are detail views of the conveyor locking means;

Figure 7 illustrates a stem completed but for mounting a filament thereon;

Figure 8 is an exploded view of the stem parts;

Figure 9 is a view showing the relative position of the stem elements just prior to the stem press forming operation;

Figure 10 is an enlarged plan view of a portion of the conveyor and a stem holding head;

Figure 11 is a front view of a stem holding head;

Figure 12 is a side view of the head;

Figure 13 is an enlarged plan view of a portion of the lower conveyor member and a well block assembly secured thereto;

Figure 14 is a front view of the well block assembly;

Figure 15 is a side view of the well block assembly;

Figure 16 is a detail view of one of the holding members of the well block assembly;

Figure 17 is a detail view of the other holding member of the well block assembly;

Figure 18 is a plan view of the mechanism for actuating the flare holding arm of the stem holding head;

Figure 19 is a side elevation of the flare holding arm actuator mechanism;

Figure 22 is a front elevation of the lead wire feeding mechanism;

Figure 23 is a side elevation of the lead wire feeding mechanism;

Figure 24 is an enlarged side view of the lead wire pick-up finger;

Figure 25 is a detail view illustrating the lead wire shuttle actuating means;

Figure 26 is a front view of the lead wire pick-up finger;

Figure 27 is a diagrammatic view of the means for preventing feeding of a lead wire when no flare is present in the head at the lead wire feeding station;

Figure 28 is a detail view of the lead wire pick-up finger and its actuating mechanism;

Figure 29 is a side view of the exhaust tube feeding mechanism;

Figure 30 is a detail view illustrating the action of the exhaust tube holding arm actuating means;

Figure 31 is a fragmentary detail perspective view illustrating the action of a feeler mechanism for preventing feeding of exhaust tubes when no flare is present in a holder;

Figure 32 is a view similar to Figure 31 showing the parts in a different position;

Figure 33 is a side view of the mechanism for correctly positioning a flare in its holder;

Figure 34 is a plan view of the flare adjusting lever and flare;

Figure 35 is a detail view showing the means by which exhaust tubes are correctly positioned in the flares;

Figure 36 is a side elevation of the mechanism for forming the press of the stem;

Figures 37 and 38 are plan views of the press forming die members showing their operating and retracted positions respectively;

Figure 39 is a perspective view of a stem with the press portion formed thereon;

Figure 40 is a detail sectional view taken along line 40—40 of Fig. 1 showing the flexible means for connecting the conveyor frame member to the main machine frame;

Figure 41 is a plan view of the mechanism for removing completed stems from the machine;

Figure 42 is a side elevation of the mechanism for removing completed stems; and Figure 43 is a view showing the means by which the bead at the top of the stem is formed.

Figure 1:
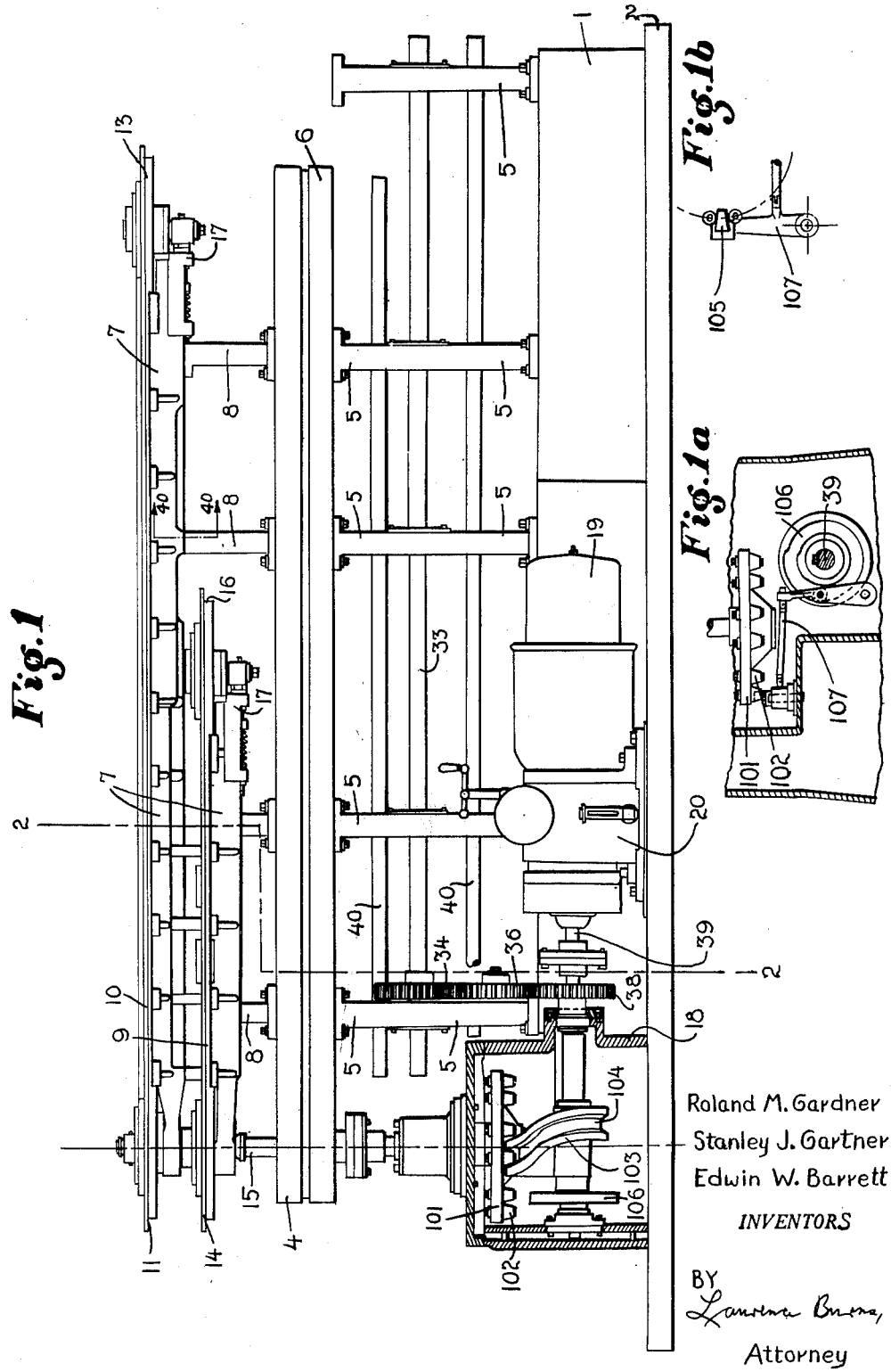

The main frame 1 of the machine desirably is composed of an elongated substantially straight base portion 2 and a superstructure 3 rigidly mounted upon and spaced above the base. The superstructure is composed of a supporting element 4 upon which a plurality of mechanisms are mounted which function in sequence to fabricate a stem unit. The support 4 may be mounted upon the base 2 in any desired manner and is shown herein as held in position parallel to the base by means of a plurality of columns 5.

The support 4 extends the full length of the machine and presents at least two flat straight platens 6 upon which the above mentioned fabricating mechanisms are detachably mounted.

The upper frame portion 7 of the superstructure is rigidly secured to the member 4 in any suitable manner as by the columns 8. The frame portion 7 extends parallel to the member 4 and functions to support and guide a pair of endless chain conveyors 9 and 10 the straight portion of which moves accurately parallel to the platens 6 of the member 4.

The conveyor chain 10 is driven by a sprocket 11 which engages it at one end of the frame 7 while at its other end the conveyor travels over an idler sprocket 13. The portions of the conveyor between the sprockets travel in straight parallel lines.

The conveyor chain 9 is situated directly below the conveyor 10 and is driven by a sprocket 14 desirably mounted upon a vertical drive shaft 15 which is common to the sprocket 11 and journalled in the frame 7 at its upper end. The other end of the conveyor 9 travels over an idler sprocket 16. The idler sprockets 13 and 16 are journalled upon short shafts mounted in chain tightening devices 17 slidably adjustable upon the frame 7.

The lower end of the drive shaft 15 extends into a machine driving unit desirably enclosed in a casing 18 upon the base 2. Power to drive the machine may be obtained from any suitable source such as the electric motor 19 which desirably is provided with a variable speed reducing drive 20, the output of which is coupled to the machine driving mechanism within the casing 18.

Figure 3:
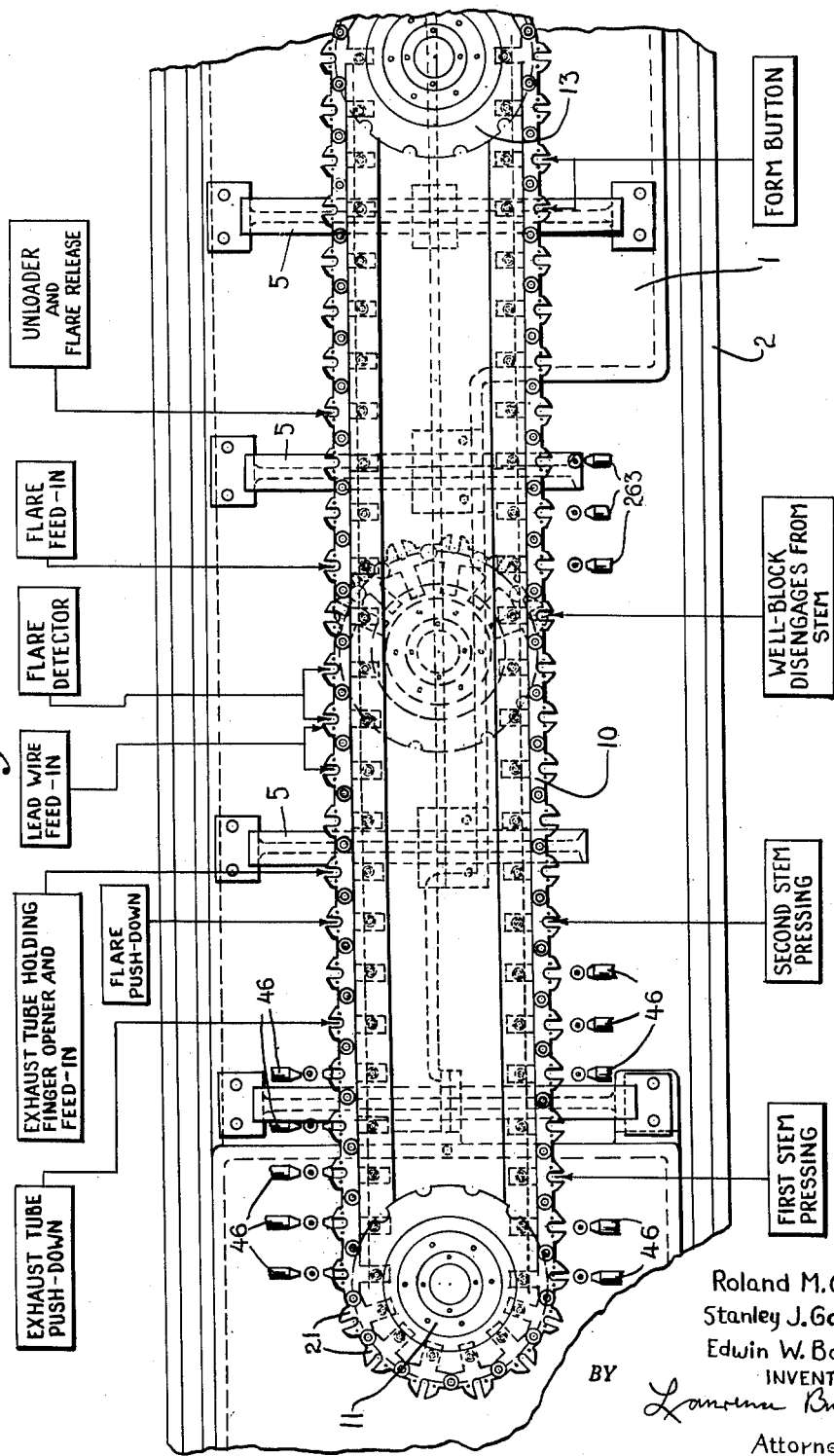
Figure 3 is a partial plan view of the machine illustrating the conveyor members and indicating diagrammatically the relative position of the stem fabricating mechanisms shown elsewhere.
Figure 6:
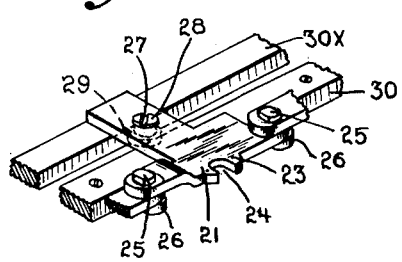
Figure 6 is a perspective view of a portion of the conveyor chain and its guide rails.

Each of the two conveyor chains are of the same construction and comprise a plurality of pivotally interconnected links 21 (Fig. 3). The link 21 is so constructed that it constitutes support and guiding means for each of the stem holding and transporting heads 22 each of which is removably secured to a projecting ear 23 on each link, the ear 23 being provided with a slot 24 and extending laterally outward from the body 21 of the link. The ends of the links are provided with pivot pins 25 which connect adjacent links (Fig. 6). The pins 25 project downward and have rotatably mounted thereon anti-friction rollers 26. The links also have a lateral extension 27 extending in a direction opposite to the projection 23. The extension 27 is provided with a downwardly extending pin 28 upon the lower end of which is rotatably mounted an anti-friction roller 29.

Figure 4:
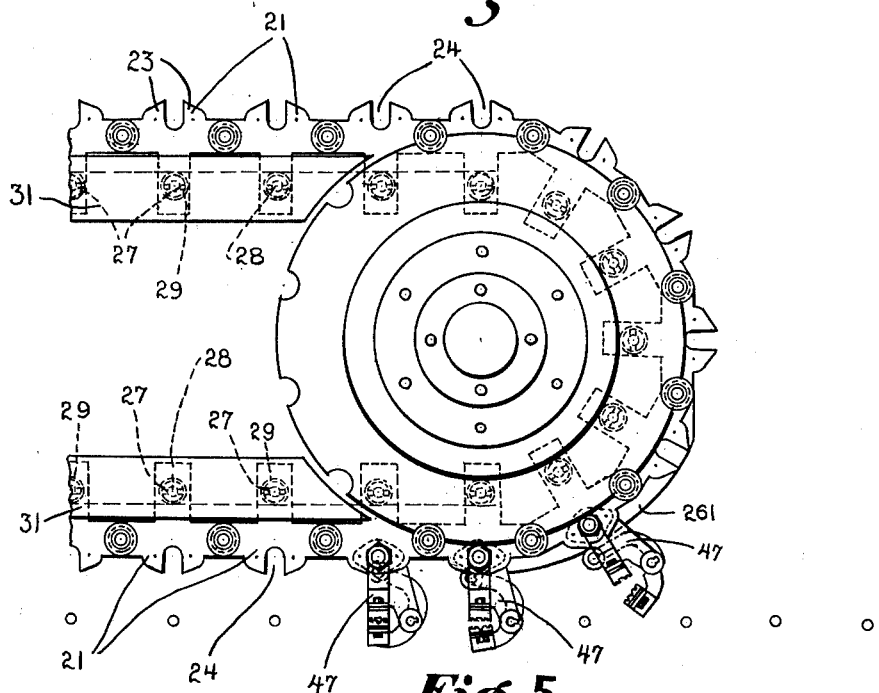
Figure 4 is a partial plan view of the lower conveyor member showing the disengagement of the well blocks from partially completed stems.
Figure 5:
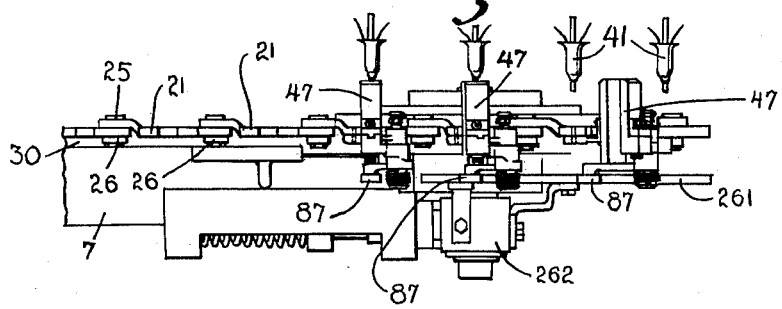
Figure 5 is a side elevation of the elements shown in Figure 4.

The rolls 26 and 29 engage respectively the outer and inner edges of a guide rail 30 which is rigidly secured to the frame 7. The links are thus positively guided in a straight path horizontally. Another guide rail 31 is situated above and engages the upper face of extension 27 (Fig. 4). The upper face of the extension 27 rides upon the lower face of the rail 31 while the lower face thereof rides upon the upper face of the rail 30. The links are thus guided vertically between the rails 30 and 31 and horizontally by engagement of roll 26 and roll 29 with opposite faces of the rail 30. The rails 30 and 31 are rigidly secured to the frame member 7 in any suitable manner such as by means of screws, as shown in Figure 10. The rail 30 may have an auxiliary member 30X situated inwardly of but not engaging the roll 29. The upper rail 31 desirably embraces substantially the full length of the extension 27 and desirably has a small clearance at its outer margin to reduce friction. Normally therefore the rail 31 contacts only the inner end of the extension 27. The weight of the heads 22 establishes the contacting areas between the links and the guiding members in the manner above described. The rail 31 is held properly spaced from the rail 30 by spacing blocks 31X. The conveyor 9 is provided with guiding means of the same construction.

Figure 2:
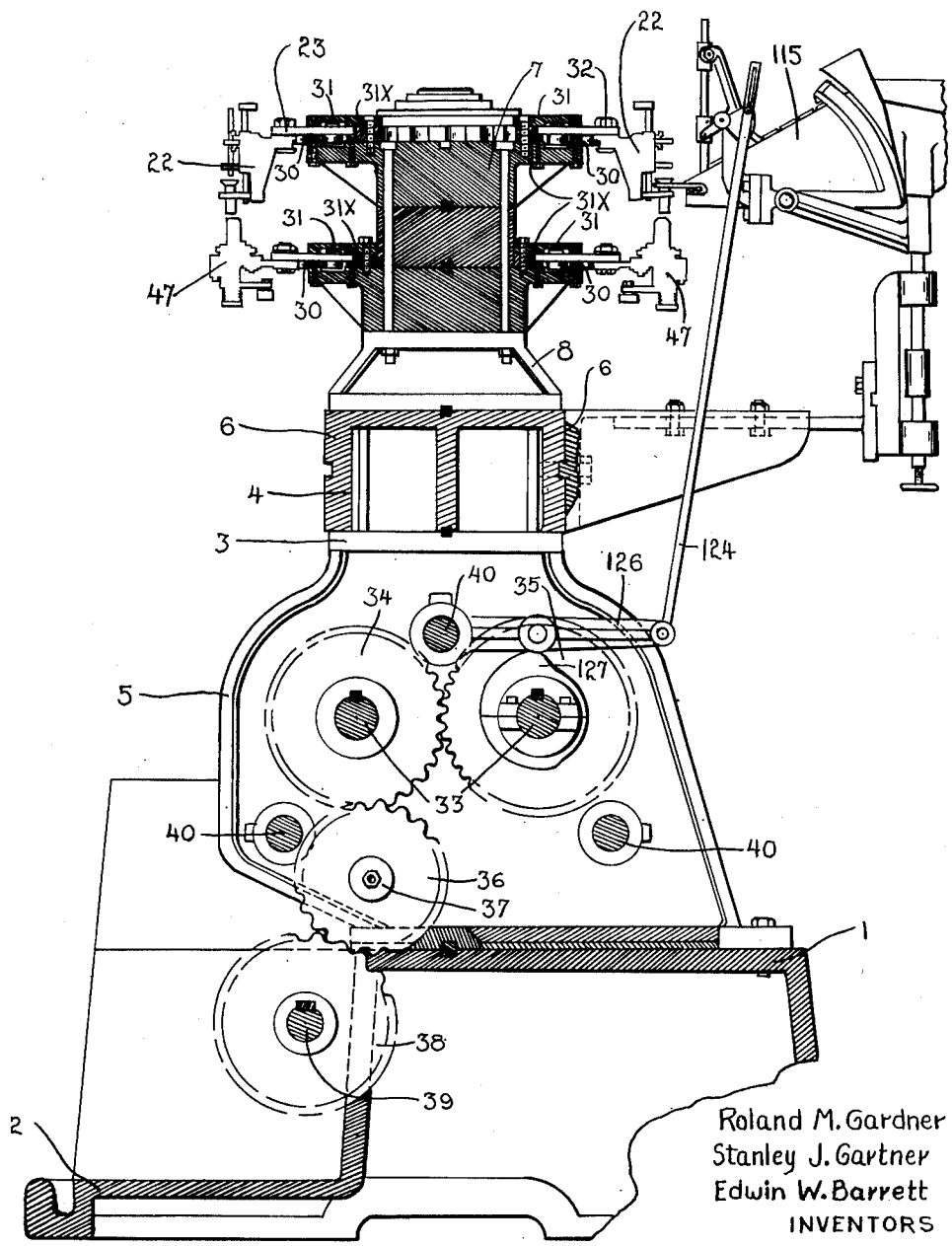
Figure 2 is a vertical cross section on line 2—2, Figure 1.

Acting in conjunction with the heads 22 are the above-mentioned operational devices to be described hereinafter and which act to fabricate the article being produced. These operational devices are secured upon the platens 6 upon the member 4 and are actuated by cams mounted upon cam shafts 33 journalled in the columns 5 of the machine frame (Fig. 2). Any desired number of cam shafts may be provided. Two cam shafts are illustrated herein, disposed below the member 4 and arranged parallel and symmetrically spaced with respect to each platen 6.

The cam shafts are driven in timed relation to the travel of the conveyors in any suitable manner. As herein shown they are each provided with gears 34 and 35 keyed upon the ends of the shafts 33. The gears 34 and 35 mesh with each other and are in turn driven by an idler gear 36 meshing therewith and rotatably mounted upon a short shaft 37 mounted in the column 5 adjacent the drive unit 18. The gear 36 is in turn driven by an intermeshing gear 38 keyed upon the output shaft 39 of the reducing unit 20.

The column members 5 also support a plurality of fulcrum shafts 40 which extend for the full length of and are parallel to the cam shafts 33 (Fig. 1). The fulcrum shafts are situated in convenient positions to fulcrum a plurality of cam actuated levers for actuating the said operational devices. The cams and levers will be described hereinafter in greater detail.

The machine of the present invention is adaptable to various fabricating procedures and is particularly adapted to the fabrication of stem assemblies for incandescent and fluorescent lamps. The elements thus far described in detail perform the basic motivating functions of the machine and are fixed parts thereof. Acting in conjunction with the motivating means are a plurality of units referred to hereinbefore as operational devices which are designed to fabricate a specific product such as a stem assembly for an incandescent lamp. The operational devices may be changed at will to convert the machine to the construction of other articles. The present machine is designed to greatly facilitate such a conversion and permit rapid and accurate adjustment of the newly installed operational units. The terms "operational units" as used herein refers to the various mechanisms which feed the parts to the machine, assemble and form the finished article.

By way of example the machine will be described as equipped to produce a conventional type of stem such as shown in Figure 7. The stem illustrated is of the type used in incandescent lamps and its disengaged component parts are illustrated in the exploded view Figure 8. The various parts are fed to the machine, combined and formed therein to complete the stem. A preformed glass flare 41 is first fed to the machine and is provided with a cylindrical portion 42 and a skirt portion 43. A pair of lead wires 44 are next fed into position within the flare, after which a glass exhaust tube 45 precut to the correct length is also placed in position within the flare. The relative position of the elements at this time is shown in Figure 9, in which position they are held by the heads 22 on the conveyor and by means of which the assembled parts are carried into the path of a plurality of burners 46 which soften the glass after which the glass is formed to the desired shape by means of conventional forming devices. Further operations are subsequently performed to complete the stem.

Each link of the conveyor 10 is provided with a head 22 while each link of the conveyor 9 is provided with a coacting member 47 commonly known in the art as a well block. The well blocks 47 and the heads 22 are maintained in alignment upon an axis common to the axis of the lamp stem while it is being fabricated. The well blocks function to maintain accurate alignment of the stem parts and coact with the heads 22 during a portion of the machine cycle.

The heads 22 are illustrated in detail in Figures 10, 11, and 12. Since all of the heads are alike a single head will be described. The elements of the head are mounted upon a rigid frame member 48 which is secured to and projects laterally from its supporting link 21. It may be secured thereto in any suitable manner. As shown herein it is detachably secured to the bottom face of the projecting ear 23 on the link by means of a bolt 49 which passes through a boss 50 of the frame 48 and through the slot 24, the head and link being held together by a nut upon the bolt. To maintain accurate alignment of the head, a pair of pins 51 project downward from the ears 23 and are received in apertures in the boss 50 thus locking the head in accurate position.

The frame 48 is provided with an exhaust tube receiving arm 52, which desirably is situated upon a vertical plane 53 extending laterally from the conveyor and substantially midway between the pivot pins 25. The arm 52 desirably is provided with means for adjusting it along the plane 53 to provide for accurate positioning of the exhaust tube 45 which is received in a vertical V-slot 54 in its front end.

The tube 45 is held in its position in the groove 54 by a retaining finger 55 which is pivoted upon a vertical shaft 56 which in turn is received in a vertical boss 57 integral with the frame 48. The finger 55 is provided at its tube retaining end with a toe portion 55a which engages the tube 45 at a point opposite the receiving arm 52. The arm 55 is provided with an actuating portion 58 extending in a direction opposite to the tube retaining portion. The toe 55a is held in resilient engagement with the tube by means of a spring 59 anchored at one end upon a spring post 60 fixed in the link 21. The post has a portion extending below the link, to which one end of the spring 59 is secured, while its other end is secured to the arm 55 at 61.

Means are also provided to receive and hold the flare 41 in the head. To do this a flare receiving block 62 is secured in a downward extension 63 of the frame 48. The block 62 has a flare positioning slot which may desirably be a vertically disposed V-slot 64.

The shaft 56 extends downward and has secured thereon an arm 66 situated in the horizontal plane occupied by the block 62. The arm 66 is shaped to reach into a position to engage the flare opposite its contact with the block 62 thus to hold the flare in its proper position. The arm is held resiliently against the flare by a spring 67. The action of the spring is conveyed to the arm 66 through the shaft 56 which extends upward above the boss 57 in which it rotates and has secured upon its upper end an actuating lever 68 which is provided with a spring post 69 projecting downward therefrom to which one end of the spring 67 is secured while the other end of the spring is secured to the spring post 60.

Desirably the shaft 56 is held in vertical position by means of a collar 301 secured thereto and received in a slot 70 in the boss 57. The collar 301 may have a stop pin 71 which acts to limit the inward travel of the arm 66 by engagement of the frame 48 to prevent undesirable engagement of the arm with the block 62 when no flare is present.

Means are also provided for guiding and holding the lead wires 44 in proper position against the inner walls of the cylindrical portion 42 of the flare. To accomplish this end a pair of flexible guide arms 72 are spaced substantially the required distance apart of the lead wires and anchored rigidly at their inner end to a block 73 which in turn is provided with a trunnion portion 74 rotatably received in a boss 75. Means are provided and will be described hereinafter for flexing the arms 72 inward while the wires 44 are being placed in position after, which the arms are permitted to return to their normal position and in so doing engage and move the wires into proper position during their return movement.

As above stated, well block assemblies 47 are provided to cooperate with the heads 22 in supporting and positioning the various components of the stem. Each well block is secured to a link of the conveyor 9 and is positioned below and in alignment with each of the heads 22. Each well block is disposed in position to receive the lower ends of the exhaust tube and lead wires of the stem assembly held by its coacting head 22.

Each of the well block assemblies 47 comprises a main frame member 76 which is provided with an attaching boss 77 which is secured to its supporting link 21 in the same manner as are the heads 22 by means of the bolt 78 passing through the boss 77 and slot 24 in the link (Figs. 13–17). The well block is held in alignment by the pins 302 projecting into the boss 77 from the link 21. The frame 76 projects laterally outward from the conveyor and has secured upon its outer end one member 80 of an exhaust tube and lead wire receiving device 81 which coacts with another similar member 82 to guide and position the exhaust tube and lead wires. The member 82 is secured to a swinging arm 83 which is pivoted upon a shaft 84 rigidly secured in an extension 85 of the frame 76. The arm 83 has an inward extension 86 having a roll 87 on its end which engages actuating means for separating the members 80 and 82 to receive or release the exhaust tube and lead wires. The members 80 and 82 are normally held in closed position by means of a coil spring 88. Desirably a cylindrical portion 89 concentric with the shaft 84 projects down from the arm 83 and serves as a core about which the spring 88 is loosely coiled. One end of the spring is anchored in the arm 83 and its other end is fixed to the stationary head 90 on the end of the shaft 84. The spring is placed under tension sufficient to hold the elements 80 and 82 in firm engagement.

The members 80 and 82 are removably and adjustably secured in position. Desirably they are each provided with angle brackets 91 to the vertical portion of which the members 80 and 82 are secured. The horizontal legs of the brackets are laterally adjustable with respect to the conveyor along the common plane 53 thereby to effect the adjustment of the members 80 and 82. The members 80 and 82 are provided along their inner faces with opposed grooves to present a recess 92 within which the lower end of the exhaust tube is received. The recess 92 is positioned accurately upon the stem axis 65.

A pair of smaller opposed grooves may be formed in each of the members 80 and 82 to present recesses 93. However, it may be more desirable to form the grooves in the member 82 only as shown in Figure 17. These grooves are parallel to and properly spaced from the recess 92 to receive the lower ends of the lead wires 44.

Suitable stop members are provided within the recesses 93 for determining the final vertical position of the lead wires.

The lower end of the inner face of the member 82 is cut away at 97 to receive a pair of stop members 98. The members 98 are vertically adjustable and have their upper ends disposed in position to be engaged by the lead wires 44 when they are fed into the recesses 93 thereby correctly determining their vertical position. Vertical adjustment of the members 98 may be provided for in any suitable manner. As shown herein they are provided with slots 99 within which locking screws 100 are received. The screws have threaded connection with member 82 and serve, when tightened, to lock the members 98 in adjusted position.

The first operation in producing a stem is to feed a flare 41 into proper position within each head 22 as they are fed to the flare feeding station. To successively feed to the heads, the conveyors are driven intermittently and come to rest at accurately determined positions. Any suitable means may be used to provide the intermittent drive. As shown herein the end of the drive shaft 15 extending into the casing 18 has secured thereto a driving wheel 101 which is provided with a plurality of downwardly projecting driving lugs equally spaced around the wheel and desirably provided with tapered rolls 102 (Fig. 1). The end of the output shaft 39 of the reducing unit 29 projects into the casing 18 and has secured to its end a cylindrical cam 103 which has a helical slot 104 therein extending substantially 150° around its periphery. The remainder of the cam is open. The cam 103 is so positioned with respect to the wheel 101 that as the cam rotates one of the rolls 102 enters the slot 104. The slot is so formed that its helical conformation acts through the roll 102 to rotate the wheel 101 and consequently the sprockets 11 and 14 the required amount to move the conveyors the length of one of their links, after which the roll passes out of the slot and the conveyor remains stationary until the cam 103 has made a complete rotation, at which time another roll on the wheel 101 has moved into position to enter the cam groove to execute another indexing cycle.

The dwell of the conveyors is of course timed to permit completion of operations at each fabricating station. If desired, means may be provided for locking the conveyors against movement while they are at rest. This may be done in any suitable manner, as by means of a stop wedge 105 which is moved into position between two rolls 102 during the dwell of the conveyors and removed from the path of the rolls during indexing by a cam 106 keyed to the shaft 39

(Figs. 1a and 1b). The cam motion is transmitted to the wedge by means of a leverage system 107 or in any desired manner.

At the initial station a flare 41 is fed into position against the block 62 of the head 22 in reversed position with its flange portion 43 upward (Figs. 18–21). At this time, the flare retaining arm 66 has been retracted to its open position. The opening movement of the arm is accomplished by motion from a cam 108 upon the adjacent cam shaft 33. Motion derived from the cam is transmitted to a rocker shaft 109 by means of a system comprising a lever and links 110, the lever of the system being fulcrumed upon one of the shafts 40.

The shaft 109 is rotatably mounted upon the frame member 7 desirably upon the upper rail 31 in a special supporting member having a base 31a from which extend upwardly and outwardly a pair of posts 111 in the upper ends of which the shaft 109 is journalled. Actuating arms 112 and 113 are secured upon the shaft 109. The arm 112 is situated to engage the actuating arm 68 of the head 22 while the other arm 113 functions to actuate the unloading station to be described hereinafter. The above mechanism is best shown in Figures 18 and 19.

The cam 108 is designed and properly timed in its operation to rock the shaft 109 to move the arm 66 into open position to receive a flare through the medium of lever 110, link 110a and an arm 114 secured upon the shaft. After the flare has been delivered the actuating arm 112 permits the spring 67 to close the arm 66 upon and hold the flare in position.

The mechanism employed for feeding the flares is or may be of conventional design. The complete mechanism will therefore not be shown. The flares 41 move by gravity down an inclined runway 115 extending laterally outward from the conveyors. The runway is composed of a pair of spaced parallel plates between which the cylindrical portion of the flare is received while the skirt portion 43 rides upon the top edges of the plates. Normally a retaining rod 116 engages and holds back a flare at the end of the runway. The runway is so situated that this flare is closely adjacent the holding block 62 of a head 22.

Immediately after the conveyors come to rest, subsequent to an indexing cycle, the cam 108 acts to rotate the shaft 109 through the lever 110, link 110a and the arm 114 which retracts the arm 66 in the manner above described. After retraction of the arm 66, the retaining rod 116 is retracted to permit the flare it is holding to move from the runway 115 into position in the V-slot in the block 62 of the head 22. This inward movement is assisted by a guide wire 117 which extends inward in a plane a short distance above the block 62 into a position to embrace and support the flare when it is in contact with the block.

After the flare has come to rest against the block 62, the cam 108 permits the arm 66 to swing into position clamping the flare under the action of the spring 67, and rod 116 is returned to its original position engaging and retaining the next succeeding flare.

Figure 20:
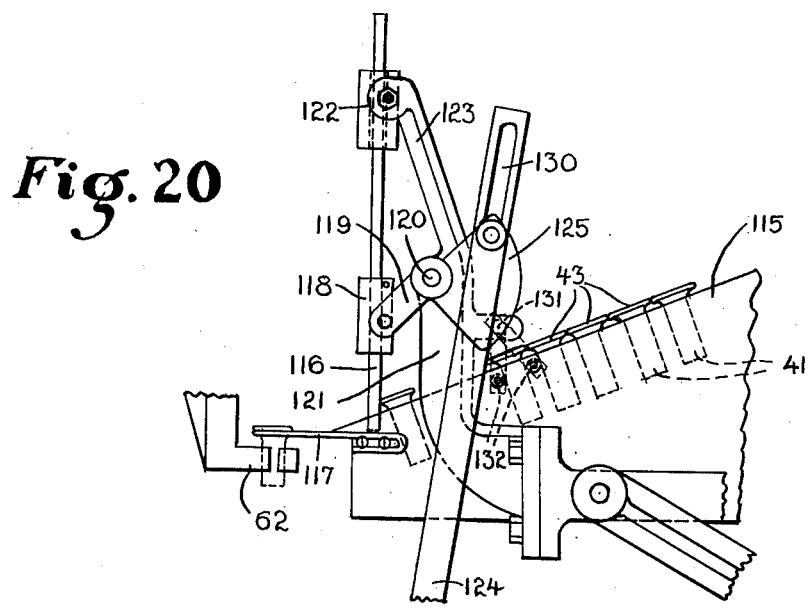
Figure 20 is a side view of the flare feeding mechanism.

Any suitable means may be used to move the rod 116 into releasing position and back again to blocking position. As shown in Figure 20 the rod is fixed in a block 118 which is pivoted to an arm 119 secured upon a shaft 120. This shaft is rotatably mounted at its ends in a pair of brackets 121 located upon opposite sides of the runway 115 and are secured to and extend inward toward the conveyor from a main bracket. The main bracket is in turn secured to the platen 6 of the machine as shown in Figure 2.

The upper end of the rod 116 is slidably guided in another block 122 which is pivoted upon an extension 123 of one of the brackets 121.

The shaft 120 is rotated to operate the rod 116 by a link 124 pivotally connected to a combination arm and cam member 125 secured upon the outer end of the shaft 120. The link 124 extends downward and is pivoted to a cam lever 126 fulcrumed upon the shaft 40 and actuated by a cam 127 having a contour designed to move the rod into its two positions during a revolution thereof.

Figure 21:
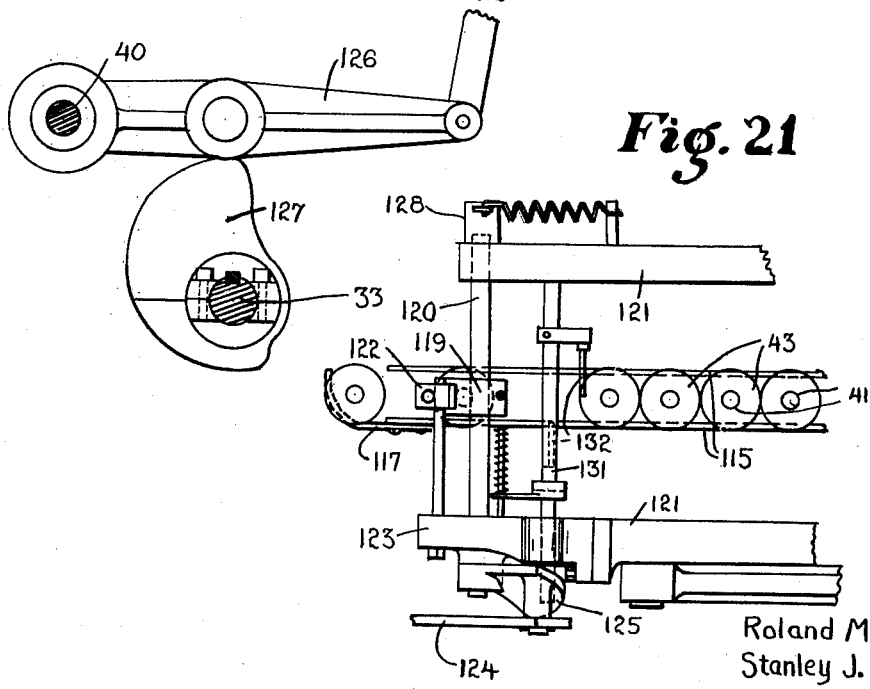
Figure 21 is a plan view of the flare feeding mechanism.

The shaft 120 is provided with another arm 128 to which a spring is attached, tending to rotate the shaft clockwise as seen in Figure 21. A slot 130 in the link 124 establishes a safety in providing a giveway in the event the rod strikes a machine part on its upward stroke. This rod actuating mechanism imparts an ideal curved upward and inward motion to the lower end of the rod 116.

If desired a further refinement may be provided in the flare feeding device which acts to release one flare at a time against the rod 116 from a line of flares held in the runway. To do this a shaft 131 reciprocates in the brackets 121 and has secured thereto a pair of stop pins 132 which are successively projected and withdrawn from the line of flares. The pins are spaced apart a distance to permit one flare therebetween. One end of the shaft 131 projects into engagement with the spiral cam face of the member 125 and is held against the cam by a suitable spring means. Oscillation of the shaft 120 to actuate the rod 116 also reciprocates the shaft 131 which causes the pins to enter and withdraw from the path of the flares. In a nonfeeding position the outermost pin 132 withholds all of the flares. When the shaft 131 shifts however, the outer pin is withdrawn and the inner pin is projected into the path of the flares; thus a flare engages the inner pin. Upon the next shift of the shaft 131 a single flare is released to engage the rod 116. Flares are thus fed one by one to the rod 116, thus relieving it of the burden of the full line of flares in the runway.

The flare which has just been fed to the conveyor will now be followed through from station to station, it being understood that a flare is fed to each head as it arrives at the flare feeding station, and all subsequent operations are performed repeatedly as a flare arrives at the various stations and is built up into a completed stem. Thus the machine produces a continuous flow of completed articles.

The head containing the flare now passes on to the lead wire feeding station where a pair of lead wires are placed in proper position in the flare. At this point in the machine cycle, the lower conveyor 9 moves into position below the conveyor 10 thereby bringing the well block assemblies 47 into position below and in alignment with the heads 22.

When the head being described arrives at the lead wire feeding station a pair of wires precut to proper length is fed to the flare and come to rest against the adjustable stops 94 in the wire slots 93 in the well blocks. The means for feeding the wires contains duplicate mechanisms, each of which manipulates a single wire simultaneously. The wires 44 are stacked in parallel relation in hoppers 136 secured upon a horizontal supporting plate 137 (Figs. 22-28). The plate is mounted upon a rigid post 138 which is adjustably secured in a rigid column 139 secured to a bracket 140 which in turn is secured to and extends laterally outward from the platen 6. Desirably the platen is provided with one or more grooves 141 within which a key upon the bracket is received.

A single wire is picked from the stacks by a pair of identical fingers 142. The innermost wires of the stacks are supported at their end portions only to permit the fingers to engage their middle portions. The fingers are vertically reciprocated by means of a yoke 143 secured to an actuator rod 144 which travels vertically within the post 138 and extends downward and is guided through the column 139 and bracket 140. The rod 144 is driven by a cam on the cam shaft 33. The cam in turn actuates a lever 146 fulcrumed upon the shaft 49, and has on its outer end a roll to engage the bottom face of the rod. The rod is held against the cam lever by a compression spring surrounding the rod and bearing at one end on the bracket 140 and at its other end against a collar on the rod.

The fingers 142 are freely pivoted upon the lower end of vertical rods 148 which are slidable in the yoke 143 and have stop shoulders at the upper end to cause them to be drawn upward by the yoke. The object of the free movement of the rods in the yoke will appear hereinafter.

The fingers 142 are provided with inwardly projecting arms 149. The rods 148 also have short rigid arms 150 above the arms 149. A compression spring 151 is received between the arms 149 and 150 and acts to swing the arms outward into engagement with the vertical edge of the pile of wires in the hoppers. The vertical motion of the fingers derived from the cam moves them over the inner edge of the stack of wires and in so doing a single wire is picked from the pile by each finger and enters horizontal slots 152 in the fingers under the action of suction induced by small holes 153 leading to ducts 154 extending up through the fingers. The ducts 154 connect with the openings in hollow pivot pins 155 upon which the fingers swing. The pivot pins are extended to receive a flexible tubing connected to a suction pump or other vacuum device not shown.

A feature of the invention resides in the construction of the fingers 142 which are provided with one or more small slots 156 extending transversely of the slots 152 (Figs. 24 and 26). The slots 156 prevent the fingers from picking up more than one wire at a time since they act to greatly reduce the suction upon any wire but that which is accurately positioned in the slot 152.

The fingers 142 are provided with short projections 157 extending outward adjacent their pivots (Fig. 28). At the end of the upward travel of the fingers, the projections 157 engage pins 158 which are rigidly fixed in a cross bar 159 mounted on a support extending upward from the plate 137. Engagement with the pins causes the fingers to swing inward and in so doing pass between a pair of stripper wires 160 fixed in supports secured to plate 137. The wires 160 strip the wires 44 from the fingers from where they fall into a pair of chutes 161 having a funnel shaped upper portion into which the lead wires fall in a substantially horizontal position and are tipped up into a substantially vertical position thereby to then travel through the lower cylindrical portions of the chutes (Figs. 23 and 25).

From the chutes 161 the wires pass into a pair of feeding or shuttle devices 162 which feed the wires into the flare. The shuttle members are spaced apart the distance between successive heads on the conveyor and each shuttle feeds one wire to each flare so that in two successive indexing operations the flares receive their two lead wires.

The shuttle members must be vertically reciprocated to enter the flares when feeding the lead wires and retracted therefrom during indexing (Figs. 22 and 23). To accomplish this the shuttles are mounted on a vertically movable shaft 163 having bearings in the column 139. Special safety means are provided for supporting the shuttles on the shaft. A yoke 164 is rigidly fastened at its central portion to the upper end of the shaft. A pair of slide bars 165 are secured in vertical position to the outer ends of the yoke. Upon the bottom ends of each bar are received blocks 166 upon which the shuttles are mounted. Stop pins are provided to retain the blocks on the bars. The weight of the blocks and the shuttles normally hold them at the bottom of the bars, but if in the operation of the machine the shuttle should accidentally engage some part of the machine or an improperly positioned flare, the blocks will ride up on the bars and prevent damage to the machine.

The shaft 163 is actuated by a cam 167 mounted on the cam shaft 33. The cam acts upon a lever 168 which has a roll at its outer end engaging the bottom of the shaft 163. The shaft is held against the lever by an expansion spring 169 surrounding the shaft and bearing against the bracket 140 at one end and against a collar on the shaft at its other end. The lever 168 is fulcrumed upon the shaft 49.

The shuttle members are pivoted to the blocks 166 upon shafts 170 arranged to permit the shuttles to swing in a plane parallel to the conveyors. The shafts 170 are rotatable and extend through the blocks 166. The extension of the shafts has arms 171 secured thereto. The arms 171 have attached to their outer ends one end of a tension spring 172 the other end of which is fixed to the blocks 166. The springs 172 therefore act to swing the upper ends of the shuttle inward toward each other.

The shuttle members 162 are provided with cam rolls 173 situated above and inward from the shaft 170 in position to engage a pair of cams 174 fixed upon the column 139 during the vertical reciprocating movement of the shuttles. At the upper end of the travel of the shuttle members the rolls 173 ride off the cams 174 and the shuttles are swung by their springs into a position having their needle portion 175 at their outermost position. During the downward motion of the shuttles the cams 174 produce a pattern of motion for the shuttles as follows. At all times the lower hollow needle-like portion 175 of the shuttle is held outside of the two flexible wire guides 72 on the head 22. At the top of their stroke the ends 175 of the shuttles are in their outer position as above stated and as they move down they pass outside of the guides 72. The rolls 173 then engage the cams 174 which act to move the ends 175 inward substantially to the axis of the flare, flexing the guides inward. The shuttles then enter the flare and, after entering, the rolls 173 ride off the lower end of the cams, at which time the springs 172 move the shuttles out to the wall of the flare at substantially diametrically opposite points. The side of the needle portion of the shuttles toward the flare wall are cut away to permit the bore of the needles to closely approach the flare wall and thus act to feed a lead wire close to the flare wall.

The action of the cams 145 and 167 is so timed that when the shuttles reach approximately their bottom position, lead wires are stripped from the fingers 142 from where they fall by gravity through the channels 161, into the shuttles and through the needle portion 175 and thence into the lead wire channels 93 in the well blocks where their final position is determined by the stop members 98.

After feeding the wires the shuttles are withdrawn by the cam 167, and when they reach their top position the needle portions thereof will have moved away from the guides 72 which then spring outward and hold the wires in their proper position against the flare wall. The conveyor is then indexed to present another flare and the lead wire feeding cycle is again repeated.

It will be noted by referring to Figure 23, that the exhaust tube holder 52 on the head 22 is so close to the flare axis that there exists a tendency for the shuttles to engage certain parts of the head 22 during the operation of the machine. To overcome this possibility the plane of the axis of the shuttles which is parallel to the conveyors is tipped away from the plane of the axis of the stems held in the conveyor. One way of doing this is to tip the whole lead wire feeding mechanism at substantially 3° from the axis of the flares as shown in the drawings.

Means are provided for preventing the lead wire feeder from feeding wires when there is no flare present in the head presented to the station. This may be done in any suitable manner and as herein shown it desirably is executed by electromechanical means. A suitable means is illustrated in Figure 23 and Figure 27, the latter view being partly diagrammatic.

As above pointed out the members 148 are slidable in the head 143 and are provided with arms 159 which serve as abutments for the finger control springs. The arms 159 also serve as supports under which horizontally slidable latches 177 may selectively be received. When no flares are present the latches engage the supports when the head 143 is at or near the top of its travel; thus the fingers 142 are held in their up position and do not pick up wires from the piles 135 while the head 143 continues to reciprocate idly. The latches 177 are held in their holding position by suitable springs 178. The outer ends of the latches project into solenoids or other electromagnetic devices 179 fixedly mounted on a post fixed in and extending upward from the support 138 and plate 137. The solenoids are connected in an electrical circuit 180 which in turn is supplied with current from a source 181 and within which a normally open switch 182 is connected. One of the switch contacts is actuated by a plunger 183 upon the inner end of which is received a feeler wire 184 which projects into the path of the flares carried by the conveyor. When no flare is present in the conveyor head the switch remains open and the unenergized solenoids permit the latches to act to prevent lead wire feeding. When flares are present the feeder wire is pushed out to close the switch contacts thus energizing the solenoids which act to retract the latches 177 and permit the fingers 142 to function. The plunger 183 is guided in a guideway 185 rigidly mounted on the machine.

The lead wire feeder mechanism above described is supported upon the bracket 140 secured to the platen surface 6 a short distance from the flare feeder mechanism. By reason of the straight line design of the machine the lead wire feeder mechanism and its operating cams 145 and 167 are readily positioned at an accurately predetermined point upon the machine.

The elements thus far described supply each head 22 with a flare and a pair of lead wires and as they continue they are next supplied with an exhaust tube by a tube feeding mechanism which may be in part of conventional design only a portion of which will be described herein (Figs. 29–32). This element is rigidly secured upon the machine platen 6 by a supporting bracket 186, upon the outer end of which is secured another bracket 187, within which is vertically adjustably received a frame member 188 which projects inward toward the conveyor and has at its inner end a pivot 189 upon which is received an exhaust tube feeding arm 190. The outer end of the arm is provided with a tube holding device 191 which receives a tube 45 from a stack of tubes 193 cut to correct length and lying in a horizontal position. The arm 190 carrying the tube is then moved upward into the dotted position shown in Figure 29, where it is deposited in the exhaust tube holding means on a head 22. At this time the tube holding arm 55 has been retracted to permit the tube to be received by the head. Means for doing this will be described hereinafter. The arm 190 is operated by a connecting rod 194 pivoted upon the arm 190 at 195. The rod 194 extends downward and is pivotally connected to an actuating lever 196 fulcrumed upon the shaft 40. The lever is provided with a roll 197 which engages a cam 198 on the cam shaft 33. The upward motion of the lever is obtained from a spring 199 connected to the lever. The cam is designed to swing the arm 190 from pick up to delivery position in accordance with the machine cycle.

Means are provided to prevent the feeding of a tube to the holder 191 when no flare is in the head 22. To accomplish this a feeler wire 200 is secured to the end of a plunger 201 which moves horizontally at right angles to the conveyor and is guided in a slot in the top of the frame 188. The plunger 201 is urged inward by the spring 202 to cause the wire 200 to move into the path of the flares. When a flare is not present in a head, a shoulder 203 on the outer end 204 of the plunger moves under a projection 192 of the end of the arm 190 and prevents it from moving down to its lowest limit as shown in Figure 32. By thus stopping the arm, the tube receiving mechanism will not pick up a tube. Thus no tube is fed to a head not having a flare therein. When a flare is present the wire 200 is moved outward thereby, thus moving the shoulder 203 out from under projection 192 and permitting the arm 190 to move down into tube receiving position where it receives a tube and then transfers it to the head 22. A spring actuated give-way is built into the connecting rod 194 to prevent damage due to jamming of misplaced tubes and provides for differences in travel of arm 190 due to the action of the feeler 200. The means for releasing a tube from the stack 193 into and delivering it to the holder mechanism 191 may be conventional.

To place an exhaust tube in the holding member 52 of the head 22 the holding arm 55 must be retracted. This is accomplished by means of an arm 205 which is moved into engagement with the actuator portion 58 of the arm 55 to swing the arm into its open or retracted position. The arm 205 is mounted upon a vertical shaft 206 rotatably mounted in a boss upon the supporting member 188 as shown in Figure 29. The shaft 206 extends downward and it has a lower bearing in the bracket 188 and has secured to its bottom end an arm 207 which in turn has pivoted thereto a link 208 which extends inward and is pivotally secured to the outer end of a lever 209 fulcrumed upon the shaft 40 and provided with a follower roll engaging a cam 210 upon a fulcrum shaft 33. The shaft 206 has another arm 211 to which a link 212 is pivoted. The link 212 extends backward in the direction opposite to that of the travel of the conveyor and is pivoted to an arm 213 secured upon a vertical shaft 214 pivoted upon a supporting bracket 215 upon which is mounted an unloading mechanism to be described hereinafter. The shaft 214 extends upward and has secured to its upper end an actuator finger 216 situated in position to engage the actuator portion 58 of the exhaust tube holding arm 55 of that head which holds a completed stem and which has just arrived at the unloader station. The timing of the machine cycle is such that the actuation or retraction of the arms 55 takes place simultaneously at the exhaust tube feeding station and the unloading station. The actuation of the arms 55 occurs shortly after the conveyor has come to rest subsequent to an indexing operation. Shortly after this the arms 112 and 113 are actuated to retract the flare holding arms 66 to release the flare at the unload station and also to permit feeding of a flare at the flare feeding station.

When a flare is fed into position in the heads it is not necessarily accurately positioned vertically. Means are provided for accurately positioning the flares in their holders. The flare feeding mechanism is adjusted to place the flares at a height which averages above the required height. The height adjusting mechanism is therefore designed to push down upon the flare until it assumes its required position.

The positioning of the flare may be executed at any convenient position subsequent to its introduction into the head. As illustrated this operation is executed immediately after the introduction of the exhaust tube. The mechanism for performing this operation is shown in Figures 33 and 34, and is supported upon a frame or bracket secured to the machine platen 6. Only a portion of the bracket 217 is shown. It is provided at its upper end with a fulcrum pivot 218 within which is received a push down lever 219, the inner end of which is U-shaped and presents a pair of arms 220 upon which are secured a pair of contact buttons adapted to engage the skirt 43 of the flare at opposite points on its periphery.

The outer end of the lever 219 is bifurcated and has pivotally received therein a link 221 which extends downward and is pivotally connected to an actuator lever 222. The lever 222 is fulcrumed on the shaft 40 and actuated by a follower roll engaging a cam 223 mounted upon the camshaft 33. The cam 223 is designed to cause the lever 219 to rock about its pivot 218 and its throw is so adjusted that it will push the flare down to its correct position and will be retracted out of the path of the conveyor during the dwell between indexing operations.

To insure accurate adjustment of the throw of the lever, an adjustment 224 is provided in the link 221 which permits the accurate determination of the downward throw of the arms 220. The lever 222 is held downward by the spring 225 to maintain the roll 226 upon the cam 223.

It is desirable to further insure accurate positioning of the flare and prevent its movement into engagement with the top face of the member 81. To accomplish the desired result a thin plate 227 is secured in fixed position directly above and in engagement with the member 81 and thus acts to prevent the flare from contacting the member 81 by acting as a gauge to space the bottom end of the flare in close proximity to the member 81 which is commonly known to those skilled in the art as a well block. The plate 227 is secured to a supporting block 228 which in turn is fixed to the bracket 217.

Some of the operational devices acting upon the stems subsequent to those above described are or may be of the conventional type and of themselves form no part of the present invention. An exception to this statement however, concerns the device for unloading the completed stems from the conveyor. Such a device will be described hereinafter.

It should be understood however, that many additional operational units may be and are employed upon the machine all of which are associated with the conveyor and situated upon or adjacent the machine platen 6 and are operated by the machine cam shafts 33. Some of the units employed will be briefly described to better illustrate the general operation of the machine. One of the important advantages of the machine lies in the ease with which the units may be added to or replaced with units for performing different operations thus broadening the usefulness of the machine.

After the positioning operation performed by the lever 219 has been completed, the stems pass on to an exhaust tube positioning device. This operation is accomplished by means of a vertically reciprocating rod 229 which engages the top of the tube 45 and moves it down into and through the flare 41 until it projects beyond and extends into the well block 81 sufficiently to supply the required length of tubing to form the press portion of the stem and a button within which the filament support wires are received (Fig. 35). It may be found desirable to move the tubing down beyond the desired position and provide another rod 230 which reciprocates below the rod and is adjusted to engage and push the tube up to its final and correct position. By thus gauging the tube position from below its relative position with respect to the flare is accurately determined independently of slight variations in tube length.

The rod 229 is actuated by a conventional cam and cam lever combination in which the cam is secured on one of the camshafts 33 while the lever is mounted on one of the fulcrum shafts 40 in the same manner as the mechanism for positioning the flares 41 as shown in Fig. 33. The rod 230 is also actuated in a conventional manner similar to that of the rod 229. An aperture 230X is provided in the member 67 through which the rod moves.

The flare and tube now pass on to a zone containing a plurality of gas burners 46 where the exhaust tube and flare are fused together and while they are in a plastic state a pair of dies 232 engage the elements and shape the press of the tube (Figs. 36 and 37). The stems then pass through another heating zone traveling around the sprocket 11 along the side of the machine opposite to that upon which the previously described units are secured.

If desired additional forming dies may be provided to more accurately form the press portion of the stem. At this time blasts of air are introduced into the exhaust tube from above to open an exhaust hole in the softened glass at the press through which the completed lamp is exhausted. Conventional means usually employed in the lamp-making art may be used to effect this operation.

The dies 232 are moved into operating position and out and away from the path of the conveyors between indexing operations. Any suitable means may be employed to accomplish this result. As shown herein the dies are moved in such a manner that the flat sides of the finished press are parallel to the path of movement of the conveyor.

A mechanism for performing this operation is shown in Figures 36, 37 and 38. The mechanism is supported upon a bracket 233 fixed upon the machine platen 6. The bracket 233 is provided with upper and lower bearings within which is rotatably received a vertical shaft 234 upon the upper end of which is secured a die holding head 235 upon the upper end of which the dies 232 are pivoted at 236. The dies swing from their operating position shown in full lines into their open position Figure 36. In their operating position the forming plates 237 engage and flatten the stem.

A pair of actuating links 238 are pivoted to the dies at 239. The links extend downward and are pivoted at their lower end upon a die actuating member 240 which is splined upon and rotates with the shaft 234. The member 240 is moved along the shaft 234 to actuate the dies by means of a member 241 surrounding the shaft and engaging the top of the member 240. The member 241 is in turn actuated by a rod 242 vertically slidable in the bracket 233 to which the member 241 is fixed.

The member 240 is engaged and moved upward by a spring 243 surrounding the shaft 234 and moved downward by the rod 242 upon the lower end of which is pivoted a link 244 which in turn is pivoted to the outer end of a lever 245. The lever 245 is fulcrumed upon a shaft 246 pivoted in a depending portion of the bracket 233. The other end of the lever 245 is provided with a roll which engages the periphery of a cam 247 fixed upon a cam shaft 33. The cam 247 is designed to cause a relatively rapid movement of short duration of the rod 242 to perform the pressing operation.

In addition to the opening and closing movement of the dies 232, the dies and the head 235 must be bodily moved out of the path of the conveyor. This is accomplished by rotating the shaft 234. To rotate the shaft a crank arm 248 is secured to the lower end thereof and is pivotally connected to one end of a link 249 by a universal joint. The other end of the link is connected to the upper end of a lever 250 by means of a universal joint. The lever 250 is fulcrumed on the shaft 44 and is provided with a follower roll which engages a cam 251 secured upon the cam shaft 33.

The cam 251 is designed to provide the required degree of throw to impart the correct motion to the link 249 to rotate the shaft 234 to swing the head 235 and the dies 232 from the position shown in Figure 37 to that shown in Figure 38.

The swing of the head 235 is approximately 90° which is sufficient to swing the dies into operating position and then away from the path of the conveyor. The cams 247 and 251 are so timed that the head is swung into operating position immediately after the indexing operation. At this time the dies are separated, and immediately after the head is in position the dies swing up into forming position and back again, after which the head moves out away from the conveyor.

If it is desired to form the press in two operations, another mechanism like that above described can be secured to the machine platen and mechanical connections provided to operate the second mechanism from the first. A stem upon which the press forming operation has been completed is shown in Figure 39. A short section of exhaust tube 32 projects from the press 253. This section of the tube is subsequently formed into a bead for receiving filament mounting support wires.

The stems now move to position adjacent the sprocket 16 over which the conveyor 9 carrying the well blocks passes. The well blocks at this time therefore move away from their heads 22 and must therefore be opened to detach themselves from their engagement with the tip of the exhaust tube. A cam 261 is secured to the bearing member 262, within which the sprocket has its bearing, in a plane situated to engage the rolls 87 upon the well blocks. The rise of the cam is positioned to successively be engaged by the rolls 87 upon the arms 86 of the well blocks. The two halves of the well blocks are thus separated and move away from the stems. The timing of the action of the cam 261 is such that the well block opens just prior to the position where the conveyor 9 starts its circular path about the sprocket 16. As the conveyor passes around the sprocket the rolls ride off the cam and the well blocks close under the action of their springs 88.

The stems are now held only by the heads 22 on the conveyor and move into the path of gas burners 263 where the tip 252 of the exhaust tube is heated and shaped into a button 264 as shown in Figure 43. This operation is performed by a plunger 265 which is reciprocated into engagement with the softened glass of the tip 252 to form the solid bottom 264. The plunger 265 is reciprocated by a conventional cam and lever combination in which the cam is secured on one of the cam shafts 33 while the lever is mounted on one of the fulcrum shafts 40.

The heat generated by the burners which soften the glass is absorbed to an appreciable extent by the frame member 7. This condition causes an unequal expansion between the frames 7 and the supporting structure 4 having the platens 6 thereon, because the comparatively remote member 4 receives very little of the heat from the burners. To prevent the development of destructive forces means are provided to permit the upper member 7 to move slightly with respect to member 4 and its supporting columns 8. Such means are desirably provided at two or more of the columns 8 adjacent the idler sprocket 13. A suitable means is shown in Figure 40 in which an anchor bolt 254 of special form is provided to permit expansion and contraction of the member 7.

The bolt 254 is provided with a bottom threaded portion 255 rigidly anchored in the top of the column. The body portion of the bolt extends through an aperture 256 in the frame. The aperture desirably is of the correct shape to closely embrace the bolt at its side portions but is elongated lengthwise of the member 7 thus permitting relative lengthwise movement thereof.

The top of the aperture 256 is enlarged to provide a shoulder 257 against which a heavy spring 258 bears. The spring is backed by a retainer member 259 which is held in position by a screw 260 having threaded connection with the upper end of the bolt. The spring acts to firmly hold the member 7 down upon the end of the column but permits lengthwise movement thereof.

The present machine is so constructed that several operational units may be installed to perform the various steps necessary to mount a filament upon the stem and thus put the stems into a condition ready to be fused to their enclosing envelopes. The filament mounting units are not shown but may be mounted upon the machine platen as are those above described and may be operated by cam and lever systems mounted on the fulcrum shafts 40 and cam shafts 33.

When the completed stems arrive at the unloading station shown in Figure 41 and Figure 42, they are removed from the conveyor and carried away by another conveyor or deposited in a suitable container to await further operations.

The unloading mechanism is supported upon a bracket 266 rigidly secured to the platen 6, the upper portion of the bracket being provided with a horizontal slot within which a slide 267 is received. The slide 267 moves in a path at right angles to the conveyor and is operated in any suitable manner. As shown, the outer end of the slide is slotted and has rotatably mounted therein a roll 268. One end of a bell crank lever 269 is bifurcated and embraces the roll 268. The lever 269 is pivoted at 270 upon the bracket 266. The other end of the lever has pivotally connected thereto a link 271 which extends downward and is pivotally connected to the outer end of a lever 272 which in turn is fulcrumed on the fulcrum shaft 44. The lever 272 is provided with a roll 273 engaging a cam 274 upon the cam shaft 33. The cam 274 is designed to cause the slide 267 to move in to pick off a completed stem and then move out to deposit the stem in a receiving member during the dwell of the conveyor between indexing operations.

The inner end of the slide member is provided with a gripping means to remove the stem from its holder on the conveyor. The gripping means is provided with a fixed member 275 and a spring actuated moveable member 276. The member 275 is notched at 277 at its end adjacent the conveyor to present tube gripping faces for engaging one side and the front of the tube. The member 276 is provided with a head portion having a cam face 278 and a diagonally disposed tube holding face 279 situated to engage the exhaust tube of the stem slightly above the tube holding member 52 on the conveyor head.

The member 276 is pivoted upon the slide 267 at 280 and is resiliently held in tube clamping position by a spring 281. The outer end 282 of the member 276 extends at right angles to the slide 267 and is disposed in position to be engaged by a fixed stop 283 upon the bracket 266 when the slide is fully retracted from the conveyor. The member 276 is thus rocked into stem releasing position.

As hereinbefore stated the supporting bracket 266 also serves rotatably to support the shaft 214 which carries the arms 216 and 213.

The operation of the unloader is as follows. Just prior to the inward motion of the slide 267, the arm 213 engages and swings the exhaust tube holding arm 55 of the conveyor head into open position. The slide 267 then moves inward until the cam face 278 engages the exhaust tube and further movement permits the tube to enter the notch 277 whereupon the tube holding face 279 snaps into engagement with and grips the tube. At this instant the flare holding arm 66 is swung to open position through the medium of the arm 112 engaging the arm 68 upon the shaft 56 common to both arms 66 and 58. The actuating elements for the shaft 214 and the arm 216 have been described hereinbefore. The slide 267 now moves away from the conveyor carrying the completed stem with it until the end 282 of the member 276 engages the stop 283 at which time the stem is released and falls into a container provided to receive it or it may be deposited upon another conveyor not shown which carries it to a remote point where further operations may be performed thereon.

What we claim is:

1. In a machine for fabricating stem members for electric lamps and thermionic devices, a main frame, long and short superposed chain type conveyors supported by and movable on said frame, means for driving said conveyors at the same speed including driving sprockets engaging the respective conveyors, idler sprockets for supporting the free ends of the conveyors, a plurality of stem element holding members secured at regular intervals upon said long conveyor, a plurality of supplementary stem holding members on said short conveyor and coacting with the holding members on said long conveyor to support the stems while they are processed and means for disengaging each supplementary holding member from its stem when it reaches and starts to follow the periphery of its idler sprocket.

2. In a machine for fabricating stem members for electric lamps and thermionic devices, a main frame, long and short superposed chain type endless conveyors on said frame, means for positively guiding said conveyors in a straight and parallel path for at least a portion of their length, conveyor driving means including a shaft having a pair of sprockets of the same diameter secured thereon and engaging the conveyors, idler sprockets for supporting the free ends of the conveyors, a plurality of stem holding members secured to the upper and longer conveyor having releasable positioning means for holding an exhaust tube and flare in proper relative position for assembly, two part supplemental holding means on said short conveyor adapted for holding the bottom end of the exhaust tube, means for separating the parts of the supplemental holding means to disengage them from the tube when they are moved away from the holders on the long conveyor by traversing the idler sprocket of the short conveyor, and means on said frame for forming and assembling the stems during the operating cycle of the machine.

3. An automatic stem machine comprising a main frame, a pair of superposed conveyors movably mounted on the frame, a plurality of stem element holding members on one of the conveyors, means fixed on the frame at a succession of stations for executing fabricating operations on the stem elements, means for intermittently moving both conveyors in synchronism from station to station, stem element carrying blocks on the other conveyor coacting with each stem element holding member on the one conveyor to align the stem elements for a portion of the machine cycle and means for disengaging said blocks from the stem elements which they carry during the remainder of the machine cycle.

4. In an automatic machine for assembling stem members for electric lamps and tubes, a main frame, a pair of conveyor members movably mounted on said frame in superposed relation, means for driving said conveyors in unison, a plurality of holding means on one of said conveyors for gripping and holding stem members, means on the other of said conveyors for aligning stem members, said aligning means being in register and coacting with the holding means on the said one of said conveyors for a portion of the travel of the first-mentioned conveyor, and means for moving the means for aligning stem members out of register and coactive relation with the holding means on the said one of said conveyors for another portion of the travel of the first-mentioned conveyor.

5. In an automatic machine for fabricating stem members for electric lamps and tubes, a main frame, first and second chain type conveyors movably mounted on said frame in superposed relation, actuating means having sprockets for driving said conveyors in unison, a plurality of holding devices on the first conveyor for holding stem member elements, means on said second conveyor for aligning stem member elements, said means being in register and coacting with the holding devices on the first conveyor for a portion of the travel of the first-mentioned conveyor, means for moving the means for aligning stem member elements out of register and coactive relation with the holding devices on the first conveyor for another portion of the travel of the first-mentioned conveyor, and stem forming devices secured to said frame and arranged successively adjacent to the path traversed by said conveyors operable to execute the required stem forming operations.

6. An automatic machine for assembling stem members for electric lamps and tubes comprising: a main frame, first and second chain type conveyors arranged in superposed relation on said frame and traveling in a straight line for at least a portion of their cycle, driving means having sprockets for driving said conveyors in unison, a plurality of holding devices on said first conveyor for holding stem members, means on the said second conveyor for aligning stem members, said means being in register and coacting with the holding devices on the first conveyor for at least a portion of the travel of the first-mentioned conveyor, means for moving the means for aligning stem members out of register and coactive relation with the holding devices on said first conveyor for at least a portion of their travel, a plurality of stem forming devices secured to said frame and arranged in succession along the path traversed by said conveyors and parallel to the straight portions thereof, at least one cam shaft also parallel to the straight portion of the path of the conveyors, means for driving said shaft in timed relation to the movement of the conveyors, cams on said cam shaft, and mechanisms actuated by said cams for operating said stem forming devices.

7. In an automatic machine for fabricating a stem for electric lamps and tubes, a main frame, first and second conveyors arranged in superposed relation on said frame, means for driving said conveyors at the same speed, a plurality of upper holding devices secured to the first and uppermost conveyor acting to hold elements of the stem and having a pair of separable automatically closing gripping fingers to hold the flare portion of the stem and automatic means thereon for holding an exhaust tube in axial alignment with its flare portion, a plurality of two part stem element aligning devices secured to the second and bottom conveyor in register and coacting respectively with each holding device on the upper conveyor to support and position the bottom end of the exhaust tube, means mounted on said frame for opening a holding device on said first conveyor to receive a flare therein, means acting to insert an exhaust tube in its holding means, means to move the exhaust tube axially downward into the aligning device on the bottom conveyor, means for sealing the flare and exhaust tube together, means for opening the two part stem element aligning devices after the sealing operation, and means to move the aligning devices away from their coacting upper holding devices while they are open.

8. In an automatic machine for assembling stem members for electric lamps and tubes, a main frame, a pair of conveyor members movably mounted on said frame in parallel planes, means for driving said conveyors in unison, a plurality of holding means on one of said conveyors for gripping and holding stem members, means on the other of said conveyors for aligning stem members, said aligning means being in register and coacting with the holding means on the said one of said conveyors for a portion of the travel of the first-mentioned conveyor, and means for moving the means for aligning stem members out of register and coactive relation with the holding means on the said one of said conveyors for another portion of the travel of the first-mentioned conveyor.

9. In a machine for fabricating stems for lamps and other thermionic devices from a plurality of components including glass and lead-wires: a pair of independent supporting members for the glass and lead-wires; and individual conveyors, disposed adjacent to one another, for each member of said pair of independent supporting members, said conveyors moving said members of said pair of independent supporting members in registry during a portion of the movement of said conveyors and out of registry during another portion of the movement of said conveyors.

10. In a machine for fabricating stems for lamps and other thermionic devices from a plurality of components including glass and lead-wires: a pair of independent supporting members for the glass and lead-wires; and individual superposed conveyors for each member of said pair of independent supporting members, said conveyors moving said members of said pair of independent supporting members in registry during a portion of the movement of said conveyors and out of registry during another portion of the movement of said conveyors.

ROLAND M. GARDNER.
STANLEY J. GARTNER.
EDWIN W. BARRETT.

(References on following page)

References Cited in the file of this patent

UNITED STATES PATENTS

| Number | Name | Date |
|---|---|---|
| 850,625 | Blank | Nov. 28, 1905 |
| 1,119,642 | Rothacker | Dec. 1, 1914 |
| 1,338,500 | Eisler | Apr. 27, 1920 |
| 1,460,651 | Hall | July 3, 1923 |
| 1,597,439 | Fagan et al. | Aug. 24, 1926 |
| 1,612,537 | Schroeder | Dec. 28, 1926 |
| 1,655,141 | Fagan et al. | Jan. 3, 1928 |
| 1,659,613 | Phelps et al. | Feb. 21, 1928 |
| 1,698,321 | Staudenmeir et al. | Jan. 8, 1929 |
| 1,742,966 | Muller | Jan. 7, 1930 |
| 1,800,467 | Moore | Apr. 14, 1931 |
| 1,898,784 | Mey | Feb. 21, 1933 |
| 1,907,532 | Flaws, Jr. | May 9, 1933 |
| 2,005,496 | Donovan et al. | June 18, 1935 |
| 2,153,370 | Donovan et al. | Apr. 4, 1939 |
| 2,186,490 | Marvin | Jan. 9, 1940 |
| 2,303,587 | Snyder | Dec. 1, 1942 |
| 2,373,798 | Williams | Apr. 17, 1945 |
| 2,407,878 | Greetham | Sept. 17, 1946 |